United States Patent
Lundberg

(10) Patent No.: US 6,363,361 B1
(45) Date of Patent: Mar. 26, 2002

(54) COMPUTERIZED PATENT AND TRADEMARK FEE PAYMENT METHOD AND SYSTEM FOR LAW FIRMS

(75) Inventor: Steven W. Lundberg, Edina, MN (US)

(73) Assignee: Patent & Trademark Fee Management, LLC, Burnsville, MN (US)

(*) Notice: Subject to any disclaimer, the term of this patent is extended or adjusted under 35 U.S.C. 154(b) by 0 days.

(21) Appl. No.: 08/898,377

(22) Filed: Jul. 22, 1997

(51) Int. Cl.[7] .............................................. G06F 17/60
(52) U.S. Cl. ........................................ 705/40; 705/34
(58) Field of Search .............................. 705/40, 42, 44, 705/34

(56) References Cited

U.S. PATENT DOCUMENTS

| | | | | |
|---|---|---|---|---|
| 5,465,206 A | * | 11/1995 | Hilt et al. ....................... | 705/40 |
| 5,649,117 A | * | 7/1997 | Landry ........................... | 705/40 |
| 5,794,221 A | * | 8/1998 | Egendorf ....................... | 705/40 |
| 5,864,830 A | * | 1/1999 | Armetta et al. ................ | 705/41 |
| 5,950,174 A | * | 9/1999 | Brendzel ....................... | 705/34 |
| 6,041,315 A | * | 3/2000 | Pollin ........................... | 705/45 |

FOREIGN PATENT DOCUMENTS

| | | | | |
|---|---|---|---|---|
| EP | 0527639 A2 | * | 2/1993 | ........... G07F/19/00 |
| WO | WO 99/13422 A | * | 3/1999 | ........... G06F/17/60 |

OTHER PUBLICATIONS

Depree et al., "What are reasonable fees and expenses for legal services?", The CPA Journal, Nov. 1999, vol. 64, No. 11, p. 82.*
Heid, Jim, "Time–billing software", MacWorld, Jul. 1994, vol. 11, No. 7, p. 139.*
Bellone, Robert, "A dozen of the hottest verticals", Accounting Technology, Apr. 1996, vol. 12, No. 3, p. 29.*
Evans, Cheryl D., "The best legal software for paralegals", Legal Assistant Today, May/Jun. 1996, vol. 13, No. 5, p. 32.*

* cited by examiner

Primary Examiner—Tariq R. Hafiz
Assistant Examiner—Alexander Kalinowski
(74) Attorney, Agent, or Firm—Schwegman, Lundberg, Woessner & Kluth, P.A.

(57) ABSTRACT

A computerized method and system for the payment of patent and trademark fees is disclosed. The patent or trademark fee for a client of a firm is charged against an account maintained by an organization separate from the firm. A charge issued at a workstation at the firm is delivered to a patent or patent and trademark agency, or a foreign associate firm, where it is cashed against an account maintained by the separate organization. The firm bills the client for the fee, along with a service charge, while the separate organization bills the firm for the fee and the service charge. Payment from the client to the firm for the fee and service charge is then sent to the separate organization to cover the firm's bill from the separate organization.

34 Claims, 23 Drawing Sheets

FIG. 10

View Account Balances...

| Account Name | | Account Balance |
|---|---|---|
| EPO Deposit Account, Acme | | No Balance kept for this account. |
| PTFM Checks for U.S. PTO | | No Balance kept for this account. |
| PTFM EPO Deposit Account | | No Balance kept for this account. |
| PTFM U.S. PTO Deposit Account | | No Balance kept for this account. |
| Retainer Account, Acme | $ 8,767.00 | |
| SLW&K Checking Account | | No Balance kept for this account. |
| SLW&K EPO Deposit Account | $ 100,000.00 | |
| SLW&K U.S. PTO Deposit Account | $ 23,000.00 | |
| U.S. PTO Deposit Acct, Acme | | No Balance kept for this account. |

Selected 9 records in 0.34 seconds

Requests...

| Transaction | Status | Date/Time Requested | Account Name | Check#/Auth.# |
|---|---|---|---|---|
| Check | Exported | 07/15/1997 04:09:44 PM | PTFM Checks for U.S. PTO | 1510 |
| Check | Exported | 07/15/1997 03:33:20 PM | PTFM Checks for U.S. PTO | 1509 |
| Authorization | Exported | 07/15/1997 03:24:05 PM | PTFM EPO Deposit Account | 1022 |
| Authorization | Exported | 07/15/1997 03:23:46 PM | PTFM EPO Deposit Account | 1021 |
| Authorization | Exported | 07/15/1997 01:29:21 PM | PTFM EPO Deposit Account | 1020 |
| Check | Exported | 07/15/1997 01:29:07 PM | PTFM Checks for U.S. PTO | 1508 |
| Authorization | Exported | 07/15/1997 01:10:49 PM | PTFM EPO Deposit Account | 1019 |
| Check | Exported | 07/15/1997 01:09:57 PM | PTFM Checks for U.S. PTO | 1507 |
| Authorization | Exported | 06/27/1997 11:33:03 AM | PTFM EPO Deposit Account | 1018 |
| Check | Exported | 06/27/1997 11:31:05 AM | PTFM Checks for U.S. PTO | 1506 |
| Authorization | Exported | 06/24/1997 02:58:17 PM | PTFM EPO Deposit Account | 1017 |
| Check | Exported | 06/24/1997 02:57:55 PM | PTFM Checks for U.S. PTO | 1505 |

Selected 53 records in 0.71 seconds

FIG. 17

July 22, 1997     Payee: U.S. Patent & Trademark Office
                  Fee Code: 101/201 Basic Filing Fee-Utility
                  Client Number: 00997
                  Matter Number: xxxx
Note: This requires special attention.

July 22, 1997      $ 2,000.0

Two Thousand AND 0/100 DOLLARS
U.S. Patent & Trademark Office

FIG. 18

PTO Management Company Invoice
Invoice Date: July 22, 1997

Item:
 Check Number: 1511
 From Account:
 58-67-9785 - PTFM Checks for U.S. PTO
 Request by:
 Brian Larson                         on: 07/22/1997 12:53:16
 Client Number: 00997                 Matter Number: xxxx
 Note: This requires special attention.

Check Amount:      $ 2,000.0
                                                  Fee:       $ 118.75
                              Total Due By 09/20/1997:     $ 2,118.75

Discounted Total Due If Paid By 08/11/1997:    $ 2,029.69
                   Discounted Total Due If Paid By 08/11/1997:    $ 2,059.38

FIG. 19

```
Deposit Account Authorization
PTFM EPO Deposit Account                    Account Number: XYZ234784
Authorization Number: SLWK00021023
Date              Fee Code                                      Check Amount
July 22, 1997     sdhfsfd                                             $ 300.0

Payee: European Patent Office
Requested by: Brian Larson              on: 07/22/1997 12:44:18
Client Number: 00999
Matter Number: sfgs                         Fee Assessed:        $ 6.75
```

FIG. 20

```
PTO Management Company Invoice
Invoice Date: July 22, 1997
─────────────────────────────────────────────────────────────────
Item:
Authorization Number: SLWK00021023
From Account:
XYZ234784 − PTFM EPO Deposit Account
Request by:
Brian Larson                       on: 07/22/1997 12:53:16
Client Number: 00999               Matter Number: xxxx Authorization Amount:  $ 300.0
                                                   Fee:   $ 6.75
                              Total Due By 08/21/1997:   $ 306.75
```

FIG. 21

Activity Report
Schwegman, Lunberg, Woessner & Kluth

Activity for: July 01, 1997 to July 22, 1997

Printed on: July 22, 1997

| Date and Time | Matter | Account | Trans. Type | Check No. | Payee | Amount |
|---|---|---|---|---|---|---|
| Client Number: 00997 | | | | | | |
| 07/15/1997 | 222222 | PTFM Checks for U.S. PTO | Check | 1508 | U.S. Patent & Trademark Office | $ 500.00 DB |
| 07/15/1997 | aewrw | PTFM EPO Deposit Account | Authorization | 1021 | European Patent Office | $ 3,000.00 DB |
| 07/15/1997 | 111 | PTFM Checks for U.S. PTO | Check | 1509 | U.S. Patent & Trademark Office | $ 500.00 DB |
| 07/22/1997 | xxxx | PTFM Checks for U.S. PTO | Check | 1511 | U.S. Patent & Trademark Office | $ 2,000.00 DB |
| | | | | | | $ 6,000.00 DB |
| Client Number: 00998 | | | | | | |
| 07/15/1997 | 222222 | PTFM EPO Deposit Account | Authorization | 1019 | European Patent Office | $ 1,800.00 DB |
| 07/15/1997 | 222222 | PTFM EPO Deposit Account | Authorization | 1020 | European Patent Office | $ 400.00 DB |
| 07/15/1997 | 111111 | PTFM EPO Deposit Account | Authorization | 1022 | European Patent Office | $ 500.00 DB |
| | | | | | | $ 2,750.00 DB |
| Client Number: 00999 | | | | | | |
| 07/15/1997 | 11111 | PTFM Checks for U.S. PTO | Check | 1507 | U.S. Patent & Trademark Office | $ 2,000.00 DB |
| 07/15/1997 | 123141 | PTFM Checks for U.S. PTO | Check | 1510 | U.S. Patent & Trademark Office | $ 460.00 DB |
| 07/22/1997 | sfgs | PTFM EPO Deposit Account | Authorization | 1023 | European Patent Office | $ 300.00 DB |
| | | | | | | $ 2,760.00 DB |
| | | | | | | $ 11,510.00 DB |

FIG. 22

Activity Report
Schwegman, Lunberg, Woessner & Kluth

Activity for: July 01, 1997 to July 22, 1997

Printed on: July 22, 1997

| Date and Time | Client | Matter | Trans. Type | Check No. | Payee | Amount |
|---|---|---|---|---|---|---|
| Account: PTFM Checks for U.S. PTO | | | | | | |
| 07/15/1997 | 00999 | 11111 | Check | 1507 | U.S. Patent & Trademark Office | $ 2,000.00 DB |
| 07/15/1997 | 00997 | 222222 | Check | 1508 | U.S. Patent & Trademark Office | $ 500.00 DB |
| 07/15/1997 | 00997 | 111 | Check | 1509 | U.S. Patent & Trademark Office | $ 500.00 DB |
| 07/15/1997 | 00999 | 123141 | Check | 1510 | U.S. Patent & Trademark Office | $ 460.00 DB |
| 07/22/1997 | 00997 | xxxx | Check | 1511 | U.S. Patent & Trademark Office | $ 2,000.00 DB |
| | | | | | | $ 5,460.00 DB |
| Account: PTFM EPO Deposit Account | | | | | | |
| 07/15/1997 | 00998 | 222222 | Authorization | 1019 | European Patent Office | $ 1,8000.00 DB |
| 07/15/1997 | 00998 | 222222 | Authorization | 1020 | European Patent Office | $ 400.00 DB |
| 07/15/1997 | 00997 | aewrw | Authorization | 1021 | European Patent Office | $ 3,000.00 DB |
| 07/15/1997 | 00998 | 11111 | Authorization | 1022 | European Patent Office | $ 550.00 DB |
| 07/22/1997 | 00999 | sfgs | Authorization | 1023 | European Patent Office | $ 300.00 DB |
| | | | | | | $ 6,050.00 DB |
| | | | | | | $ 11,510.00 DB |

FIG. 23

COMPUTERIZED PATENT AND TRADEMARK FEE PAYMENT METHOD AND SYSTEM FOR LAW FIRMS

FIELD OF THE INVENTION

This invention relates generally to a computerized method and system for the payment of patent and trademark fees, and more specifically to such a computerized method and system in which a patent or trademark fee for a client of a firm is charged against an account maintained by an organization separate from the firm.

BACKGROUND OF THE INVENTION

When a patent or trademark application is filed with a patent or trademark agency, such as the United States Patent and Trademark Office (USPTO), the filing is accompanied by a fee payable to the patent or trademark agency. This fee covers the agency's cost in reviewing and examining the filing. For example, in the case where the filing is a patent application, the fee covers the cost incurred by the agency in determining whether the application should issue as a patent.

Typically, a law firm pays the patent and trademark fees itself on behalf of its clients, and bills the fees as disbursements, or asks for and receives from the clients a retainer to use to pay the fees. Patent fees especially, however, have continued to increase greatly in the past few years. For law firms having a majority of clients that do not provide retainers, this means that such law firms have had to increasingly advance a large amount of their working capital as patent and trademark fees, which might not be paid back from their clients for a number of months, if ever.

In addition, the increasing popularity of Patent Cooperation Treaty (PCT) international patent applications has also resulted in law firms having to advance even more of their capital as patent and trademark fees on behalf of their clients. In the past, most international applications were filed directly in a desired foreign country, or in the European Patent Office. A foreign associate was thus responsible for the payment of any associated patent or trademark fees. While the law firm would still have to pay the foreign associate even if the client did not pay the law firm, this practice allowed the law firm some time to collect the fees from the client first, before paying the foreign associate. Thus, in many cases, the firm did not have to resort to its capital to pay for these expenses.

However, in the case of a PCT filing, a law firm must now immediately advance filing fees that are usually on the order of several thousands of dollars. These fees are paid out of the law firm's own working capital. Because PCT applications have grown in popularity, PCT application fees are a large cash flow burden on patent and trademark law firms. Along with the increased fees for patent and trademark filings in general, the popularity of PCT applications have frequently strained the working capital of many law firms.

Adding to this strain for United States patent and trademark firms is a rule by the United States Internal Revenue Service (IRS) that prohibits patent and trademark firms from deducting the payment of USPTO and PCT fees from earnings as a business expense. Instead, the payment of these fees is treated as a loan to a firm's clients, and is not deductible. This rule has resulted in a fiscal year-end tax and cash flow problem in itself for patent and trademark law firms.

That is, the rule means that firms cannot retain earnings to cover the capital advanced on behalf of their clients to the USPTO. Because the firms still need to have capital on hand to cover the patent and trademark fees, however, they are typically left with no other option but to pay in more working capital, or to borrow the money advanced for clients from a lending institution.

In addition, ethical considerations as codified in the rules of ethics of most states' legal bars may prevent or restrict the extent to which patent and trademark law firms can collect interest on the advancement of these fees. The typical patent and trademark law firm thus finds itself in a position in which it is forced to loan capital to its clients interest-fee to pay for patent and trademark fees advanced on behalf of the clients. As these fees have substantially increased, and as PCT applications with their high fees have grown in popularity, the typical law firm thus finds itself resorting to ever-increasing bank loans to cover shortfalls created by the advancement of these fees, increasing the firm's internal cost of doing business.

Furthermore, this problem also extends to the payment of fees for professional services of foreign associates. An American law firm requires such foreign associates so that it may file foreign patent and trademark applications on behalf of its clients in other countries. Similar to fees paid to patent and trademark agencies, foreign associate fees are billed to the law firm, which then may be forced to pay them before it receives renumeration from the clients with which the fees are associated. Thus, the typical law firm also may find itself resorting to bank loans to cover shortfalls created by advancement of foreign associate fees, in addition to patent and trademark agency fees.

SUMMARY OF THE INVENTION

The above-mentioned shortcomings and needs are addressed technologically by the present invention, which will be understood by reading and studying the following specification. The present invention describes a computerized method and system for the payment of patent and trademark fees. Specifically, the invention describes such a computerized method and system in which a patent or trademark fee for a client of a firm is charged against an account maintained by an organization separate from the firm.

In one embodiment of the invention, a computerized system comprises three computer systems: a firm computer system, a fee computer system, and an account computer system. The firm computer system is maintained by a firm such as a law firm. A charge for a patent or trademark fee for a particular client, such as a check or an authorization to debit a deposit account, is issued at the firm computer system. The firm computer system stores data representing first information regarding the charge, such as the amount and date of the charge, the client and matter for which the fee was paid, etc.

The fee computer system is maintained by an organization separate from the law firm. The fee computer system is receptive to electronic transmission of the data representing the first information regarding the charge from the firm computer system, such as via modem or over the Internet. The organization maintaining the fee computer system holds an account with a financial institution or a patent or patent and trademark agency against which the charge is payable.

The account computer system is maintained by the financial institution or the patent or patent and trademark agency. This computer system stores data representing the account held by the organization maintaining the fee computer system. The account computer system generates a statement including second information regarding the charge, also such as the amount and date of the charge, etc.

Data representing this second information is input into the fee computer system. The fee computer system then reconciles the second information regarding the charge with the first information regarding the charge. The fee computer system generates a statement or an invoice to bill the firm for the charge, plus a service fee, while the firm computer system generates an invoice to bill the client for the charge and the service fee.

Because, for example, the firm may have to repay the organization (typically a financing organization) in ninety days, while the client may have to repay the firm in sixty days, the firm does not have to advance money on behalf of the client for patent and trademark fees. The law firm issues a charge (a check or authorization to debit) payable to a patent or patent and trademark agency such as the USPTO, but the charge is payable against an account maintained by the (financing) organization, not the firm. The firm thus has time to collect the payment of patent and trademark fees from its clients prior to repaying the (finance) organization. Furthermore, the organization is amenable to providing this service, because it is able to charge a service charge passed along to the firm's clients. Because the organization is not a patent and trademark law firm, the organization is free to charge a service charge in conjunction with the loaning of money.

In different embodiments of the invention, computerized methods and systems of varying scope are described. Still other and further aspects, advantages and embodiments of the present invention will become apparent by reference to the drawings and by reading the following detailed description.

BRIEF DESCRIPTION OF THE DRAWINGS

FIGS. 8, 9, 10, 11, 12, 13, 14, 15, 16 and 17 show screen shots from an exemplary embodiment of the invention; and, FIGS. 18, 19, 20, 21, 22 and 23 show forms and reports from an exemplary embodiment of the invention.

DETAILED DESCRIPTION OF THE INVENTION

Figure 1A:
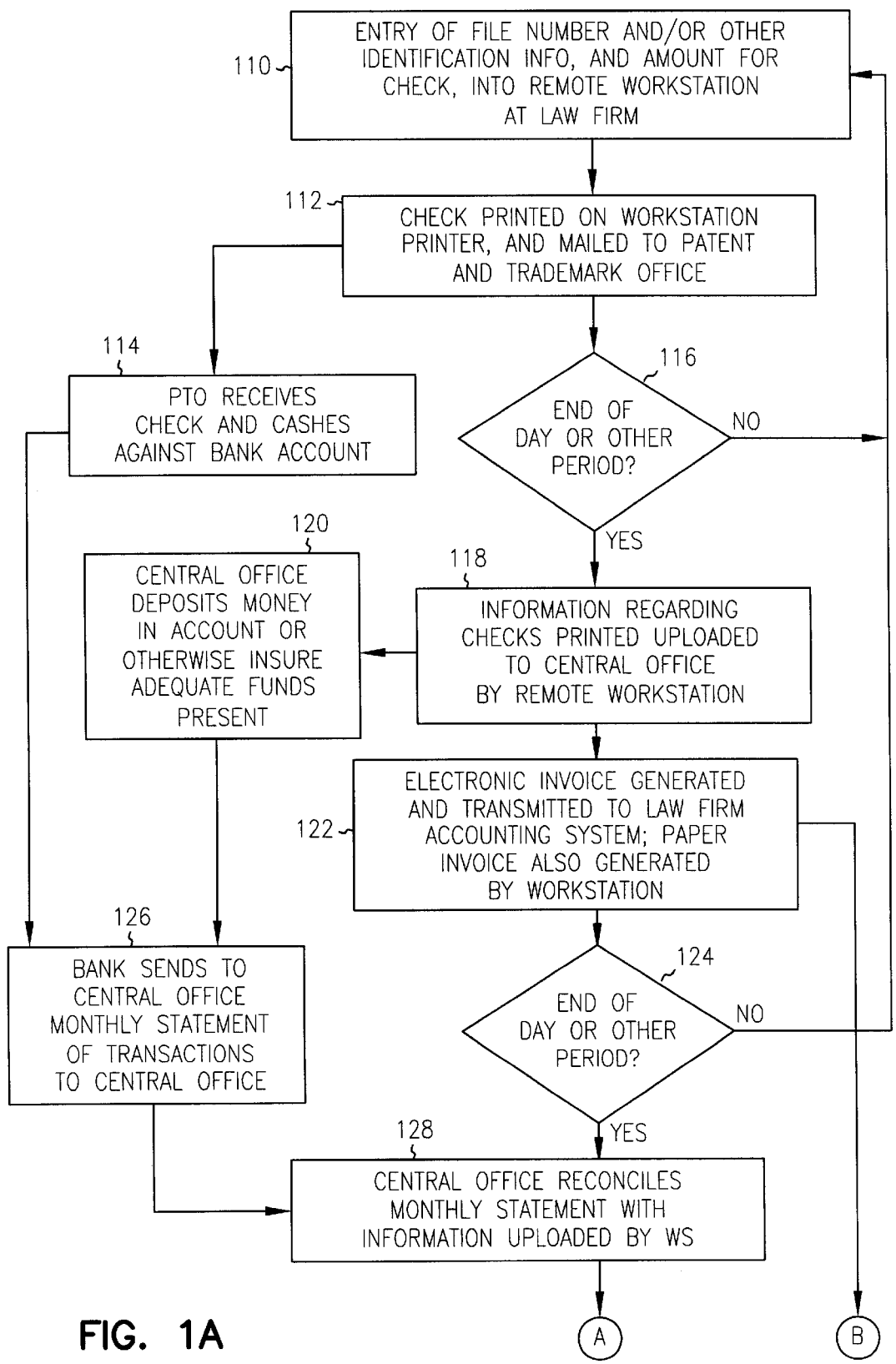
FIG. 1(a) and FIG. 1(b) show a flowchart of a first preferred computerized method of the invention.

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only be the appended claims.

This detailed description is divided into eight sections. In the first section, a first preferred computerized method of the invention is described. In this method, a law firm computer system prints checks for the payment of patent and trademark fees on behalf of its clients, the checks payable to a patent or patent and trademark agency (such as the USPTO) and against a financial account held by a separate financing organization. In the second section, a second preferred computerized method of the invention is described. In this second method, the law firm computer instead issues an authorization code for the amount of a patent or trademark fee to be debited against a deposit account held by the separate financing organization with the patent or patent and trademark agency. In the third section, an alternative embodiment of both the first and second preferred computerized methods is shown, in which the law firm computer system contacts the financing organization's computer system before issuing each charge (i.e., before printing a check, or before issuing an authorization code), so that the financing organization's computer system may approve the charge before it is issued.

In the fourth section, an exemplary system architecture in which the preferred methods of the invention may be practiced is described. The exemplary system architecture includes three computer systems: a firm computer system maintained by a firm such as a law firm, a fee computer system maintained by an financing organization separate from the firm, and an account computer system maintained by either a patent or patent and trademark agency or a financial institution. In the fifth section, exemplary hardware implementations of the firm computer system of the present invention are described. In one hardware implementation, the workstation at which a charge for a requested trademark or patent fee is issued is a stand-alone computer. In another hardware implementation, the workstation is any computer within the firm computer system. In the sixth section, other functionality provided by alternative embodiments of the invention is described. This functionality is additional to that described in the preceding five sections of the invention. In the seventh section, a software listing of a preferred embodiment is provided. Finally, in the eighth section, a conclusion of the detailed description is described.

A First Preferred Computerized Method of the Invention

Figure 1B:
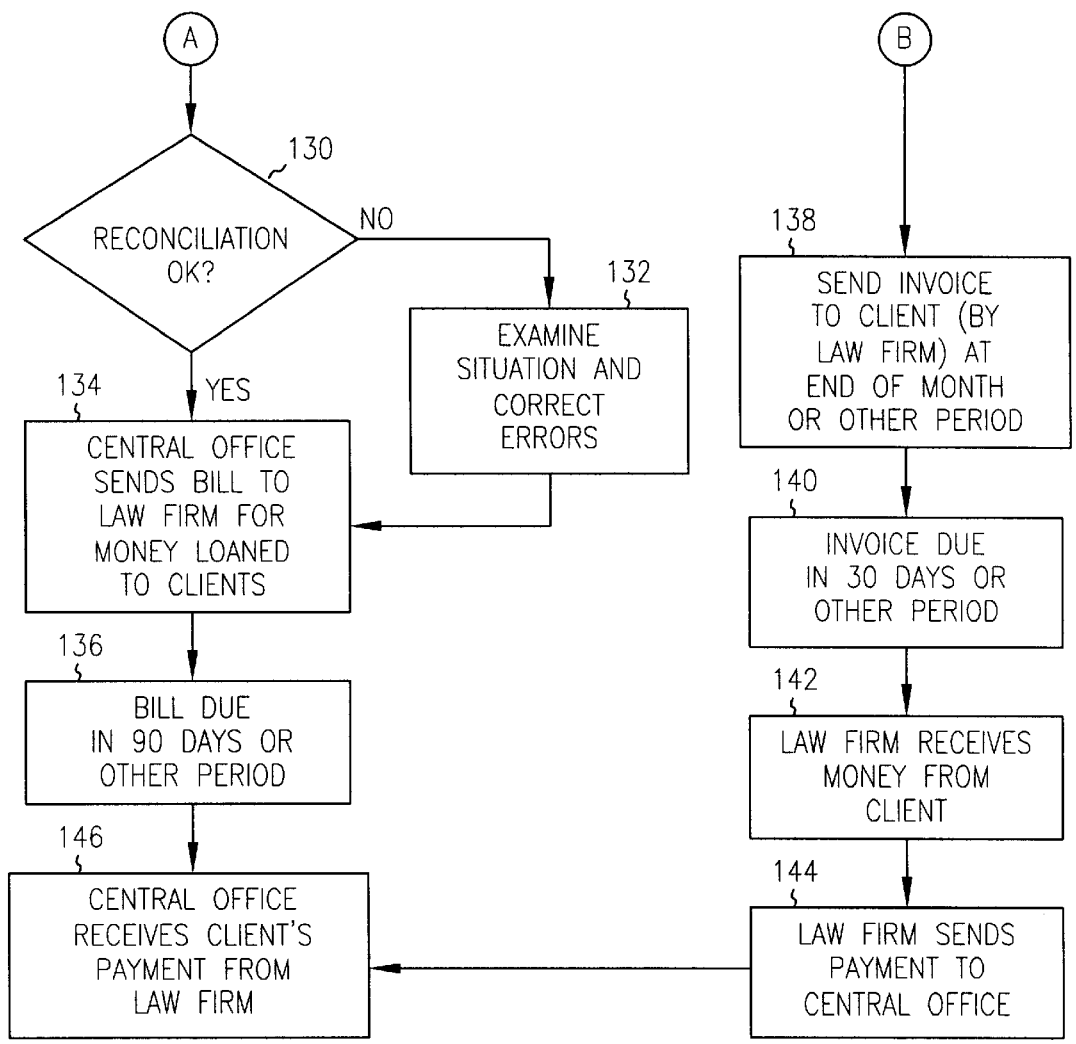

Referring to FIG. 1(a) and FIG. 1(b), a first preferred computerized method of the invention is shown. In the first preferred computerized method, a law firm computer system prints checks for the payment of patent and trademark fees on behalf of its clients, the checks payable to a patent or patent and trademark agency (such as the USPTO) and against a financial account held by a separate financing organization. Thus, the law firm does not advance its own funds on behalf of its clients to pay trademark and patent fees.

In step 110, identification information regarding a particular patent or trademark fee is entered into a workstation at the law firm. This workstation may be a computer used only for this purpose, or it may be any networked computer in the office also used for other purposes (for example, a computer in an attorney or paralegal's office that is also used for word processing, etc.). The information entered into the workstation regarding the particular fee preferably includes the amount of the fee, the payee patent or patent and trademark agency of the fee (for example, the USPTO, the European Patent Office (EPO), etc.), and the client and matter number for which the fee is being requested. Other information may also be included.

In step 112, a check is printed on a printer coupled to the workstation. The printer may be a stand-alone printer especially dedicated for the purpose of printing such checks. Alternatively, the printer may be a network printer. The printed check includes the current date, a check number, the amount of the fee, and the payee patent or patent and trademark agency of the fee. The check is mailed along with its associated filing (for example, a patent application, or an office action response) to the payee patent or patent and trademark agency. The checks may be printed as they are requested, or they may be printed as a batch job once during a predetermined period, such as once daily, twice daily, etc.

In an alternative embodiment, the check requested at step 110 may not be printed until a requested period of time, in which case it may be printed remotely, at the financing organization. For example, for a foreign associate fee, such a fee may not be due for a number of months, such as six months from the current date. However, in step 110, a check request may be made that a check for the fee be issued four months from the current date (two months prior to the due date of the foreign associate fee). When the issue date arrives, the check is printed remotely at the financing organization, and mailed directly to the foreign associate, or alternatively to the firm for mailing to the foreign associate. Note that the invoicing of this charge, as invoicing is later described in this section of the detailed description, may nevertheless be performed immediately, such that the client pays the firm for the foreign associate fee even before the financing organization cuts a check to pay the foreign associate.

In step 114, the payee patent or patent and trademark agency receives the check, and cashes it against a bank account maintained by the separate financing organization with a banking or other financial institution. Thus, the patent or trademark fee is initiated at the law firm workstation (in step 110), but is actually paid for by the separate financing organization. The law firm does not advance fees from its own working capital.

The process of the entry of a check request in step 110 and a check being printed and mailed in step 112 (for ultimate receipt and cashing by the patent or patent and trademark agency in step 114) is repeated as needed within a first predetermined period, such as a day. This is represented by step 116. If the end of the day or other first predetermined period has not been reached, the process reverts back to step 110. Thus, in a given day, a number of checks may be requested, printed and mailed.

Once the end of the day or other first predetermined period is reached, however, the process continues to step 118. In step 118, first information regarding the checks printed during that day or other first predetermined period is electronically transmitted to the financing organization's fee computer system. This may be accomplished by a modem at the workstation communicating with a modem at the fee computer system, or over the Internet, assuming that both the workstation and the fee computer system are so connected to the Internet. The invention is not limited to the manner by which electronic transmission is effectuated. For example, in another embodiment, the information is saved onto magnetic media, such as a diskette, and physically moved from one workstation to the fee computer system. The first information preferably includes for each check the date of the check, the amount of the check, the payee of the check, and the number of the check. Other information may also be included.

In step 120, the financing organization deposits, preferably electronically via the fee computer system, enough money in its account to cover the amounts of the checks issued during that day or other first predetermined period. Assuming a daily period, this provides sufficient time for the financing organization to deposit funds to cover the checks issued. For example, if on day one the law firm issues nine checks totaling $10,000 in repeated steps 110 and 112, first information regarding the nine checks will be uploaded to the financing organization's fee computer system in step 118 at the end of day one, and the financing organization will be able to deposit sufficient funds to cover the checks no later than the beginning of day two. Even if the checks are mailed via next-day mail to the patent or patent and trademark agency in step 112, by the time the patent or patent and trademark agency receives and cashes the checks on day two in step 114, the funds will already have been deposited by the financing organization into the account in step 120.

In step 122, the workstation at the law firm generates, also at the end of each day or other first predetermined period, for each check an electronic fee invoice (a first invoice; note that the different invoices described in selected sections of the detailed description are numbered to clarify the particular invoice being described, and to permit easy distinction among the different particular invoices) and transmits it to the firm's accounting system. A paper invoice (a second invoice) for verification purposes is also generated—i.e., printed on a printer coupled to the workstation. Each electronic (first) invoice preferably includes the amount of the check, the date of the disbursement of the check, the payee patent or patent and trademark agency of the check, the check number, and the client and matter associated with the check. While these second invoices, while described as being daily, may in fact be generated at the end of each day, as has been described, or at the same time as each check is printed.

Optionally, this invoice is printed with the check at step 112 on one part of a multi-part check; furthermore, optionally, only the first or second invoice (not both) is generated. That is, the daily (second) invoices are integrated into the check itself. Thus, in a single printing the check is issued, along with a separable check stub and invoice. The stub and invoice may be separable via perforated paper, although the invention is not so limited. The accounting system may be connected to the same local-area or other network as is the workstation, or may be directly connected to the workstation, etc. The invention is not so limited.

The invoice may also be a peel-off receipt or carbon that is obtained from each transmittal in conjunction with which a check has been printed. These peel-off receipts or carbons can thus be tracked, and can be used to manually enter in the invoice information into the firm's accounting system and for ultimate uploading to the financing organization. That is, the invention also contemplates the manual entry and tabulation of individual checks that are printed. Furthermore, an adhesive label may be generated, to stick to the matter file in conjunction with which the charge was advanced, such that the label serves as later proof of authorization of a check.

Therefore, the invoice printed in step 122 may be separate from the printed check, or may be part of the check form itself. Having the invoice as part of the check itself is useful in that the invoice may be a check "stub," which is easily removed from the check. Thus, the check may remain with the invoice until just prior to mailing, at which time the invoice is torn from the check. Alternatively still, the check form may be have two copies of the invoice, in the case of a three-part check.

The daily or other first predetermined period uploading of first information regarding the checks issued in step 118, the daily or other first predetermined period depositing of funds by the financing organization to cover the checks issued in step 120, and the daily or other first predetermined period generation of an electronic (first) and paper (second) invoice by the workstation and corresponding transmission to the firm's accounting system in step 122, are repeated every day or other first predetermined period until the end of the month or a second predetermined period has been reached. This is represented by step 124. If the end of the month or second predetermined period has not been reached, the process again reverts back to step 110. Thus, in a given month, each day a number of checks may be printed and sent to a patent or patent and trademark agency, information regarding which is sent to the financing organization's fee computer system, funds are deposited to cover the checks, and (first and second) invoices regarding which are generated.

While this activity is taking place, in step 126 the bank or other financial institution with which the financing organization is maintaining an account sends to the financing organization, either electronically or on paper, a statement (for example, a monthly or bi-weekly, or even daily statement), of all the activity that occurred in that account (i.e., an external source to the financing organization). The statement preferably includes second information regarding each transaction or check, including the check number, the date the check was presented for payment, the date of the check, and the amount of the check.

If the statement is transmitted electronically from the financial institution to the financing organization's fee computer system (for example, via modem communication, or over the Internet), then data regarding the second information is input directly into the financing organization's fee computer system. Otherwise, if the statement is delivered to the financing organization in paper format, data regarding the second information must be input manually into the financing organization's fee computer system. This may be by utilizing an optical character recognition (OCR) device, or having a data operator or similar personnel typing in the second information as data into the fee computer system on a computer keyboard.

In step 128, after the end of the month or other second predetermined period has been reached in step 124, the financing organization's computer system reconciles the first information regarding the checks uploaded by the workstation at the firm, with the second information inputted into the computer system. The computer system verifies that the dates, payees, and amounts of the checks as issued at the firm's workstation are consistent with the dates, payees, and amounts of the checks as received from the financial institution. If checks are issued at the workstation late in the month, second information regarding them may not have been received from the financial institution via the monthly statement, since typically a few days must pass before a given check clears at the institution. In such a situation, the fee computer system ignores the check, and flags it for reconciliation for next month.

If reconciliation is not achieved in step 130, then in step 132 the situation is examined manually, and errors are corrected as they are found. That is, the financing organization's computer system in step 130 will highlight to an account analyst or other personnel that a discrepancy has been detected. The analyst will then examine the records to determine, for example, if the law firm is issuing fraudulent checks, if the financial institution has committed an error, etc.

Once the first information regarding the checks for the month or other second predetermined period have been reconciled with the second information regard the checks, in step 134 a bill is generated by the financing organization's fee computer system and delivered to the law firm. The bill (i.e., a firm, or third, invoice) is for those checks that were cleared by the financial institution and included in the institution's statement in step 126 (that is, those checks that were not included in the statement in step 126, but were nevertheless issued in step 112, are held until the next month or other second predetermined period), plus a service charge for each check. As represented in step 136, the bill (third invoice) is preferably due in ninety days of receipt by the law firm. Optionally, the bill (or statement) includes the daily invoices that were previously generated, and does not require reconciliation as has been described.

The service charge for each check is preferably variable, depending on the amount of the check. For example, the service charge may be a particular percentage of amount of the check, such as eight percent, with a minimum service charge of twenty dollars. The service charge is charged by the financing organization for services rendered in conjunction with providing a loan to the firm's clients for the checks covering patent and trademark fees to patent agencies, and for the maintaining of deposit accounts and the software and apparatus required to operate the system. The service charge may be a flat fee, a flat fee plus a percentage of the amount paid to the patent agency on behalf of a client, a fee as looked up in the table (e.g., dependent on the amount paid to the patent agency), etc.; the invention is not so limited.

In step 138, the firm generates and sends to each client an invoice (fourth invoice) inclusive of the daily invoices (second or first) generated in step 132. This (fourth) invoice (i.e., a client invoice) may itself be included on a (fifth) invoice listing the other fees chargeable to the client, or may be a separate invoice to emphasize that the money being collected for the funds advanced on behalf of the client are those of the financing organization, and not the firm. The (fourth) invoice preferably lists for each check the date of the check, the payee patent or patent and trademark agency of the check, the amount of the check, the matter in conjunction with which the check was issued, as well as the service charge charged by the financing organization. The bill generated in step 138 typically also includes the fee schedule by which payment of the bill is governed, indicating what late charges, discounts, etc., will be provided in accordance with timely payment of the bill, or lack thereof. As represented in step 140, each client (fourth) invoice is preferably due in thirty days from receipt of the invoice, but is more typically paid sixty to ninety days from the date of the invoice.

Thus, for example, the firm in one embodiment of the invention sends to each client an invoice including all the charges and fees incurred for the client the previous billing period. These charges and fees typically include legal fees (such as attorney and paralegal fees), postage charges, photocopying charges, etc. In this embodiment of the invention, this monthly invoice also includes the charges extended on behalf of the client for the payment of patent and trademark fees, and has been described. In other words, the regular invoice the client receives includes all charges, including patent and trademark fees; the charges extended on behalf of the client are part of the regular invoice received by the client.

However, in an alternative embodiment, a special invoice may be generated and sent to a client for an unusually large patent or trademark fee (i.e., a "jumbo" fee). A firm may wish to have such a special invoice including a large fee so that it is sent to the client immediately, and there is no delay until the end of the regular billing period to send a regular invoice that might have normally included the charge. This is because the firm may desire to have the money for the fee paid sooner by the client, or may desire to accentuate to the client the enormity of the fee. The invention is not limited as to how charges included in special invoices are determined; in one embodiment, an operator at the firm (such as someone within the firm's accounting department) may manually identify such charges, while in another embodiment, all charges above a certain threshold are so earmarked for special invoicing.

Because each client (fourth) invoice is due preferably in thirty days, and the firm (third) invoice is due preferably in ninety days, typically the law firm will receive payment from its clients in step 142 to cover the firm (third) invoice before the firm invoice is due to the financing organization. Therefore, the firm will not have to use any of its own capital to cover the patent and trademark fees advanced by the financing organization for its clients. Insofar as the typical law firm's late-paying clients represent only a fraction of its total client base, such a law firm by utilizing the inventive computerized method will significantly reduce the amount of working capital allotted towards patent and trademark fees. Thus, in step 144, the firm sends payment as collected from its clients in step 142 to the financing organization in satisfaction of the (third) invoice sent to the law firm in step 134. The (third) invoice is received at the financing organization in step 146, ending the computerized method of FIG. 1(a) and FIG. 1(b).

Thus, there are three primary invoices or bills generated by the invention: the individual invoices for the individual checks generated at step 122 (either paper and/or electronic); the bill sent by the financing organization to the firm in step 134, and the bills sent by the firm to its clients in step 138. The bill sent by the financing organization to the firm in step 134 includes the information contained in the individual invoices generated at step 122; the individual invoices are generated for reconciliatory and record keeping purposes primarily. The bill in step 134 sent to the firm also includes the financing charges elicited by the financing organization. The firm sends its clients bills in step 138 to recoup the money loaned to the clients by the financing organization, as the financing organization has billed the firm in step 134.

Note, however, that the bills in step 138 sent by the firm to its clients do not necessarily have to correspond to the amounts listed in the bill sent from the financing organization to the client in step 134. For example, the firm may decide as a business decision to absorb some of the costs for a particular client, matter, or fee. In this case, the bill listed in step 134 will have a greater corresponding amount than that listed in a particular bill in step 138. The invention provides for this capability.

In other words, the invention provides for the capability of maintaining different discount or fee schedules for different clients of the firm. For example, the financing organization may charge a set service fee due at a given time, depending on the size of the amount advanced on behalf of an associated client of the firm. The firm, however, may decide that for certain clients it will underwrite or absorb a portion of this fee as a matter of course. Thus, the invention provides that the amount billed to a given client of the firm will reflect the discount accorded to the client, while the amount billed by the financing organization to the firm will still reflect the full amount. The invention therefore provides for different discount or fee schedules—including but not limited to the date when a fee is due, and the amount underwritten by the firm—for different clients.

A Second Preferred Computerized Method of the Invention

Figure 2A:
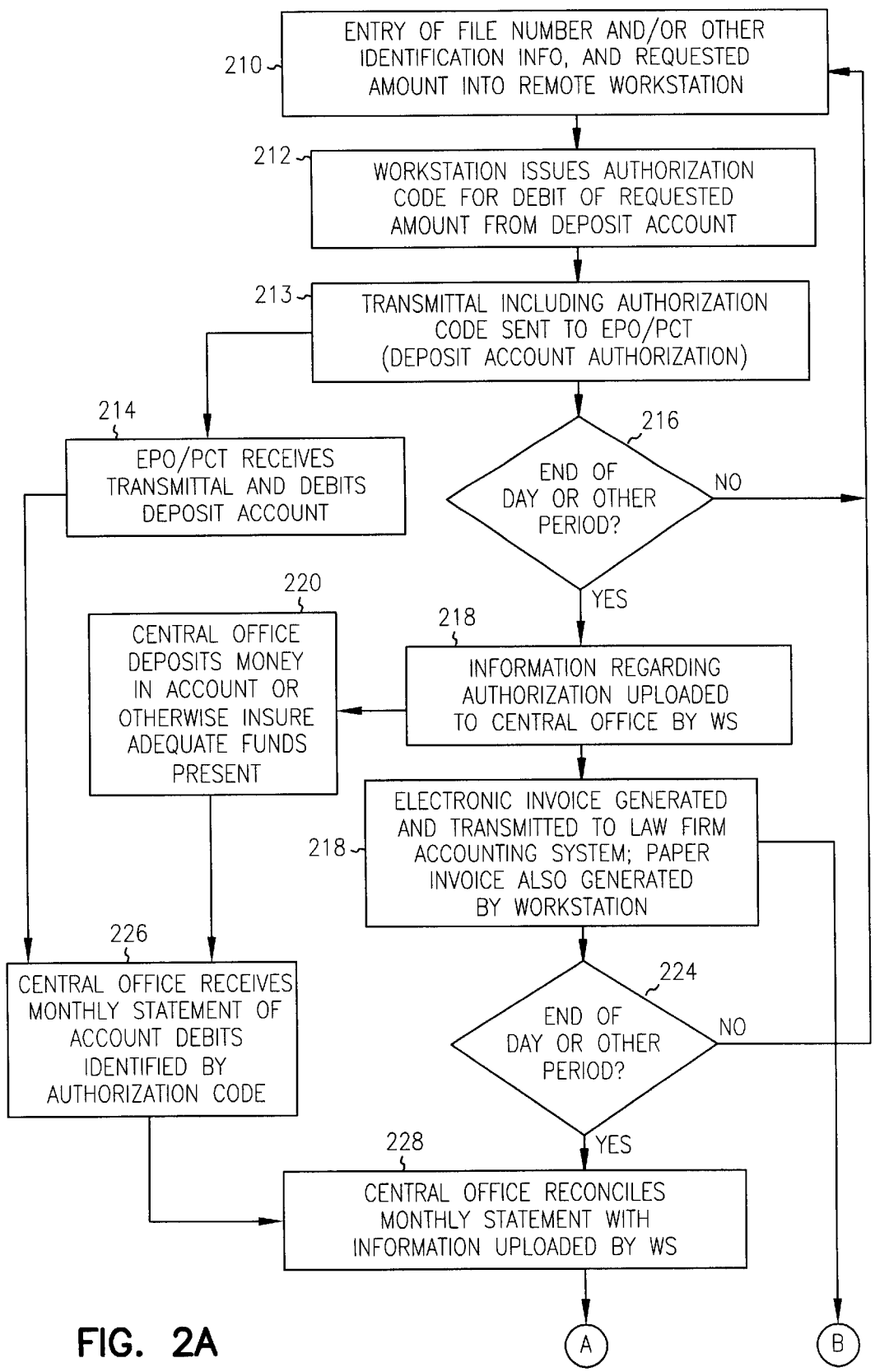
FIG. 2(a) and FIG. 2(b) show a flowchart of a second preferred computerized method of the invention.
Figure 2B:
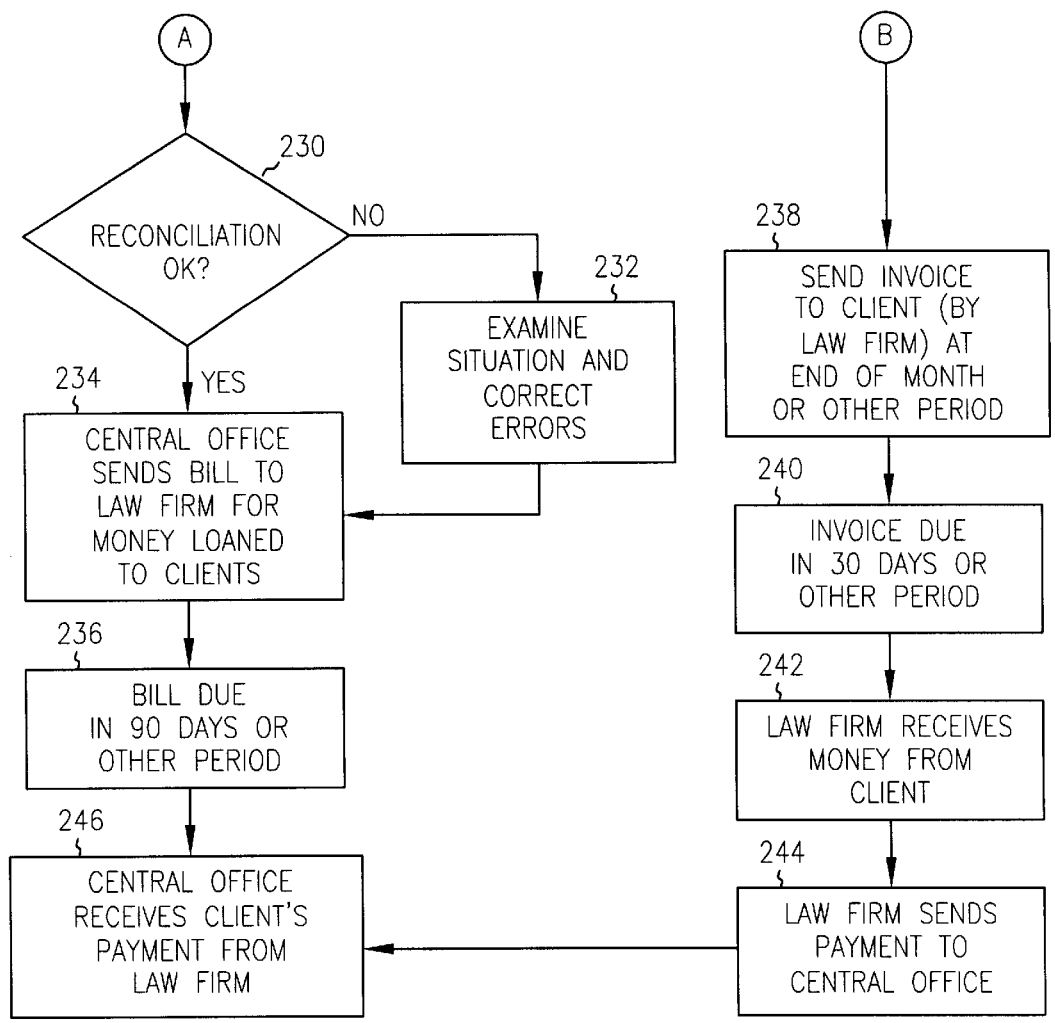

Referring next to FIG. 2(a) and FIG. 2(b), a second preferred computerized method of the invention is shown. In the second preferred computerized method, a law firm computer system issues an authorization for the debit of patent and trademark fees on behalf of its clients against a deposit or other account maintained with the patent or patent and trademark agency (such as the USPTO or EPO) by a separate financing organization. Like the computerized method of FIG. 1(a) and FIG. 1(b), the law firm does not advance its own funds on behalf of its clients. Unlike in FIG. 1(a) and FIG. 1(b), the payment is not made in the form of a check, but rather is in the form of a debit to a deposit account maintained by the separate financing organization with the patent or patent and trademark agency. Each step of the method of FIG. 2(a) and FIG. 2(b), except for step 213, corresponds to and is similar to a step of the method of FIG. 1(a) and FIG. 1(b) (step 210 corresponding to and similar to step 110, step 212 to step 112, et seq.).

Therefore, insofar as a step in the method of FIG. 2(a) and FIG. 2(b) performs a function as does its corresponding step in the method of FIG. 1(a) and FIG. 1(b), reference should be made to the discussion of the corresponding step for further understanding thereof. For example, insofar as alternative and optional embodiments and/or additional functionality are described in reference to one or more steps of FIG. 1(a) and FIG. 1(b) that are applicable to counterpart step or steps of FIG. 2(a) and FIG. 2(b), such embodiments and functionality are also applicable to the method of FIG. 2(a) and FIG. 2(b). Those of ordinary skill within the art will readily appreciate that the alternative and optional embodiments and/or additional functionality described in reference to the method of FIG. 1(a) and FIG. 1(b) are also applicable to the method of FIG. 2(a) and FIG. 2(b), and that the scope of the invention encompasses such alternative and optional embodiments and/or additional functionality in relation to FIG. 2(a) and FIG. 2(b) as well.

Furthermore, insofar as alternative and optional embodiments and/or additional functionality are described in reference to one or more steps of FIG. 2(a) and FIG. 2(b) that are applicable to counterpart step or steps of FIG. 1(a) and FIG. 1(b), such embodiments and functionality are also applicable to the method of FIG. 1(a) and FIG. 1(b). Those of ordinary skill within the art will readily appreciate that the alternative and optional embodiments and/or additional functionality described in reference to the method of FIG. 2(a) and FIG. 2(b) are also applicable to the method of FIG. 1(a) and FIG. 1(b), and that the scope of the invention encompasses such alternative and optional embodiments and/or additional functionality in relation to FIG. 1(a) and FIG. 1(b) as well.

In step 210, identification information regarding a particular patent or trademark fee is entered into a workstation at the law firm. This information includes the amount of the fee, the payee patent or patent and trademark agency of the fee, and the client and matter number or other code for which the fee is being requested. Other information may also be included.

In step 212, an authorization for the debit of the fee from a deposit account maintained by the separate financing organization with the patent or patent and trademark agency is issued at the workstation. For example, the Patent Cooperation Treaty Office (PCTO) of a subscribing nation permits the establishment of a deposit account, similar to a bank account, to which funds can be deposited, and against which payment for fees can be made. The deposit account is thus provided as a convenience by the PCTO of a subscribing nation. The authorization authorizes a law firm to debit funds from a deposit account.

In step 213, the filing associated with the authorization for debit is mailed to the payee patent or patent and trademark agency. Preferably but optionally, for each authorization generated, the work station includes an authorization code, which may be unique. The authorization code is preferably placed on correspondence to the patent agency in a manner such that it is reported back to the account holder in a deposit account report, so that traceability of the authorization is provided for. For example, the transmittal form may include instructions to the deposit account operator to enter the code plus a file number into the patent agency's system. Thus, this code may be included with the transmittal requesting a debit from the deposit account.

As another example, the authorization code may be placed in text near the deposit account authorization on the transmittal form, with instructions to have this entered into the patent agency's system by the operator in lieu of the file number. This authorization code then acts as a serial number, to keep track of each serial number issued against the deposit account (kept track of from the perspective of the firm, the patent agency, and the financing organization). The serial numbers may be automatically generated when printing the transmittal, or obtained from a counter computer program as known within the art. In addition, this serial code may be a bar code.

In an alternative embodiment of the invention, the authorization code is obtained from a separate authorization terminal which can dial into the financing organization's computer system. This separate authorization terminal may be similar to that found in retail establishments for the approval of credit card transactions. In another alternative embodiment of the invention, calls can be received at the financing organization to obtain authorization code via voice, such that the calls are answered by a live operator, or handled by an automatic voice response system. Such calls may originate from either within or without of the firm.

These alternative embodiments are additional manners by which the financing organization compiles the list of transmittals submitted and fees requested or estimated at the firm, and by which the financing organization may keep track of the type of transaction in conjunction with which the transmittals are submitted (e.g., via categories entered at the time of authorization, such as new application, issue fee, amendment, etc.). Thus, the alternative embodiments permit the financing organization's system to automatically tabulate wire transfers (or other transfers of funds to cover the charges) based on authorization codes. In addition, the utilization of type of transaction data can be used to estimate probable error rates for deposit account authorizations (e.g., issue fees are typically not often wrong, while filing fees are more prone to error, etc.). Thus, this data can be used to keep track of statistics of average errors on deposit account authorizations, to suggest an appropriate safety balance that should be kept in the deposit account to prevent overdrafting of the account.

In still another alternative embodiment, overdrafts may be handled by using a back-up as a ready reserve to cover the overdrafts. The firm may itself keep a deposit account to use as such a back-up account. Alternatively, the financing organization may maintain the deposit account.

In step 214, the payee patent or patent and trademark agency receives the filing. The payee patent or patent and trademark agency debits the deposit accounted maintained by the separate financing organization with the patent or patent and trademark agency for the amount of the fee. Preferably, the agency notes the authorization code for the transaction in its records. The process of the entry of a authorization request in step 210 and an authorization being issued in step 212 and mailed in step 213 (for ultimate receipt and debit by the patent or patent and trademark agency in step 214) is repeated as needed within a first predetermined period, such as a day. This is represented by step 216. If the end of the day or other first predetermined period has not been reached, the process reverts back to step 210. Thus, in a given day, a number of authorizations may be requested, issued, and mailed.

Once the end of the day or other first predetermined period is reached, the process continues to step 218. In step 218, first information regarding the authorizations issued during that day or other first predetermined period are electronically transmitted to the financing organization's fee computer system. The first information preferably includes for each authorization, the code itself, the date on which the code was authorized, the amount of debit for which the code was authorized, and the patent or patent and trademark agency payee. Other information may also be included (such as the serial number, as has been described). This generated first information may thus be used to keep track of information, and serve as a back-up to the financing organization's maintenance of the same information. Moreover, the firm may use this information to verify transfers to the account each day, etc. Furthermore, this permits the invoice to automatically generate invoices, other alternatively the financing organization may communicate with the firm and verify fund transfers prior to the firm uploading electronic invoices (as described later in this section of the detailed description).

In step 220, the separate financing organization deposits, preferably via wire transfer, enough money into its deposit account to cover the amounts of the debits for which authorizations were issued during that day or other first predetermined period. Assuming a daily period, this provides sufficient time for the financing organization to deposit funds to cover the debits. For example, if on day one the law firm issues ten debits totaling $5,000 in repeated steps 210 and 212, first information regarding the debits will be uploaded to the financing organization's fee computer system in step 218 at the end of day one, and the financing organization will be able to deposit sufficient funds to cover the debits no later than the beginning of day two. Even if the filings including the transmittals containing the authorizations for the debits are mailed via next-day mail to the patent or patent and trademark agency in step 213, the patent or patent and trademark agency will be able to debit the deposit account no earlier than day two— the same day on which the funds covering the debits were deposited by the financing organization in step 220.

In step 222, the workstation at the law firm generates, also at the end of each day or other first predetermined period, for each charge an electronic fee (first) invoice and transmits it to the firm's accounting system. A paper (second) invoice for verification purposes is also generated. Each electronic (first) invoice preferably includes the date of the issuance of the authorization and code, the payee patent or patent and trademark agency, the amount of the authorized debit, and the client and matter associated with the check. While these second invoices, while described as being daily, may in fact be generated at the end of each day, as has been described, or at the same time as each charge is issued.

The uploading of first information regarding the debits authorized during that day or other first predetermined period in step 218, the depositing of funds by the financing organization to cover the debits authorized for that day or other predetermined in step 220, and the generation of an electronic invoice (first invoice) and paper invoice (second invoice) and transmission to the firm's accounting system for that day or other first predetermined period in step 222, are repeated every day or other first predetermined period until the end of the month or a second predetermined period has been reached. This is represented by step 226. If the end of the month or second predetermined period has not been reached, the process again reverts back to step 210. Thus, in a given month, each day a number of debits may be authorized, information regarding which is sent to the financing organization's fee computer systems, funds are deposited to cover the debits, and (first and second) invoices regarding which are generated.

While this activity is taking place, in step 226 the patent or patent and trademark agency sends to the financing organization, either electronically or on paper, a statement of all the activity that occurred in the deposit account (i.e., an external source to the financing organization). The statement preferably includes second information regarding each transaction (for example, each debit or deposit), including the authorization of each debit, the date of each transaction, and the amount of the transaction. This second information is inputted into the financing organization's fee computer system.

In step 228, after the end of the month or other second predetermined period has been reached in steep 224, the financing organization's computer system reconciles the first information regarding the debits uploaded by the workstation at the firm, with the second information inputted into the computer system. Preferably reconciliation is performed by matching authorization codes from the financing organization's computers with the agency's records. The computer system verifies that the dates, authorizations, and amounts of the debits as issued at the firm's workstation are consistent with the second information as received from the patent or patent and trademark agency.

If debits are issued at the workstation late in the month, second information regarding them may not have been received from the patent or patent and trademark agency via the monthly statement, in which case the fee computer system ignores the debit, and flags it for reconciliation for the next month. That is, balancing (reconciliation) is only performed for those charges actually debited by the patent and trademark agency during a particular billing period. For example, a debit may be issued on July 30, but not actually be redeemed by the agency until August 2. In this case, the organization will receive a statement from the agency that does not reference this debit, assuming that statements are issued each calendar month. The organization will therefore hold the debit on its books for reconciliation in the following billing period.

If reconciliation is achieved in step 230, then in step 232 the situation is examined manually by financing organization personnel, and errors are corrected as they are found. Once the first information regarding the debits have been reconciled with the second information regarding the debits, in step 234 a bill is generated by the financing organization's fee computer system and delivered to the law firm. The bill (i.e., a firm or third invoice) is for those debits that were included in the patent or patent and trademark agency's statement in step 226, plus a service charge for each debit. As represented in step 236, the bill (third invoice) is preferably due in ninety days of receipt by the law firm.

In step 238, the firm generates and sends to each client a (fourth) invoice inclusive of the daily invoices generated in step 232. This (fourth) invoice (i.e., a client invoice) may itself by included on a (fifth) invoice listing the other fees chargeable to the client (for example, attorney's fees), or may be a separate invoice. The (fourth) invoice preferably lists for each debit the date of the debit, the authorization of the debit, the payee patent or patent and trademark agency (that is, the patent or patent and trademark agency maintaining the deposit account, the amount of the debit, the matter in conjunction with which the debit was issued, as well as the service charge. As represented in step 240, each client (fourth) invoice is preferably due in thirty days from receipt of the invoice.

Because each client invoice is due preferably in thirty days, and the firm (third) invoice is due preferably in ninety days, typically the law firm will receive payment from its clients in step 242 to cover the firm (third) invoice before the firm invoice is due to the financing organization. Therefore, the firm will not have to use any of its own capital to cover the patent and trademark fees advanced by the financing organization for its clients. Thus, in step 244, the firm sends payment as collected from its clients in step 242 to the financing organization in satisfaction of the (third) invoice sent to the firm in step 234. The (third) invoice is received at the financing organization in step 246, ending the computerized method of FIG. 2(a) and FIG. 2(b).

Figure 3:
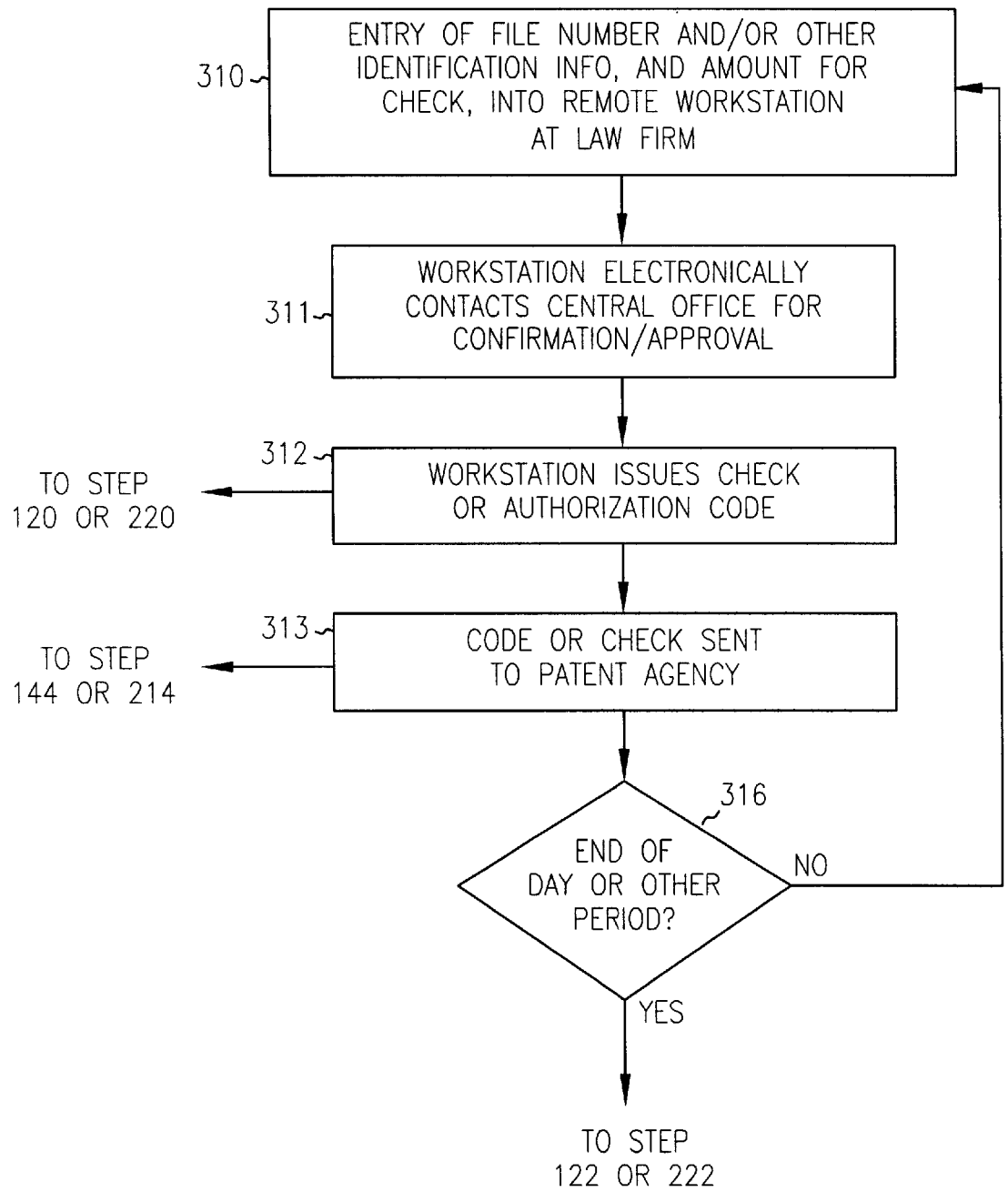
FIG. 3 shows a flowchart of an alternative embodiment of the first and the second preferred methods of the invention.

An Alternative Embodiment of the First and the Second Preferred Methods of the Invention Referring to FIG. 3, an alternative embodiment of the first and the second preferred methods of the invention is shown. In this alternative embodiment, the law firm computer system contacts the financing organization's computer system before issuing each charge (i.e., before printing a check, or before issuing an authorization), so that the financing organization's computer system may approve the charge before it is issued. The alternative embodiment of FIG. 3 replaces steps 110, 112 and 116 of the method of FIG. 1(a) and FIG. 1(b), and replaces steps 210, 212, 213 and 216 of the method of FIG. 2(a) and FIG. 2(b). Specifically, steps 310, 312 and 316 replace steps 110, 112 and 116, respectively, and steps 310, 312, 313 and 316 replace steps 210, 212, 213 and 216, respectively.

In step 310, information regarding a particular patent or trademark fee is entered into a workstation at the law firm. The information entered into the workstation regarding the particular fee preferably includes the amount of the fee, the payee patent or patent and trademark agency of the fee, and client and matter number or other code for which the fee is being requested. Other information may also be included.

In step 311, the workstation electronically contacts the financing organization's fee computer system to receive approval for the requested fee. This may be accomplished by a modem at the workstation communicating with a modem at the fee computer system, or over the Internet, assuming that both the workstation and the fee computer system are so connected to the Internet. The invention is not limited to the manner by which electronic communication is effectuated. In step 311, the workstation also sends first information regarding the requested fee. This first information includes the date of the fee request, the amount of the fee request, the payee of the fee, and the authorization (in the case where the method of FIG. 3 is an alternative embodiment to the method of FIG. 2(a) and FIG. 2(b)) or check number of the check (in the case where the method of FIG. 3 is an alternative embodiment to the method of FIG. 1(a) and FIG. 1(b)) to be issued once approval is received from the financing organization's fee computer system.

Once approval has been received in step 311, in step 312 the workstation issues a check for the requested fee in the case where the method of FIG. 3 is an alternative embodiment to the method of FIG. 1(a) and FIG. 1(b), or issues an authorization for the requested fee in the case where the method of FIG. 3 is an alternative embodiment to the method of FIG. 2(a) and FIG. 2(b). The check is printed on a printer coupled to the workstation and is payable against an account maintained by the financing organization with a financial institution such as bank. The authorization for debit of the fee from a deposit account maintained by the financing organization with the patent or patent and trademark agency.

The step of having the workstation receive electronic approval for every fee ensures that the fee computer system of the financing organization receives information regarding the debits or checks issued by the workstation as they are issued, instead of only at the end of the day (for example, in step 118 of FIG. 1(a) and FIG. 1(b), or step 218 of FIG. 2(a) and FIG. 2(b)). This allows the fee computer system to keep more timely track of the debits and checks issued at the workstation. This is advantageous because the financing organization is able to more closely monitor the firm to ensure that no fraud is occurring, and it is able to more timely learn the amount of the deposit that will be required in the account to cover the debits or checks.

From step 312, the alternative embodiment of FIG. 3 proceeds to step 120 of FIG. 1(a) and FIG. 1(b) or step 220 of FIG. 2(a) and FIG. 2(b), in which step the financing organization deposits sufficient funds to cover the debits or checks issued at the workstation. The deposit may be made as debits or checks are requested at the workstation, or may be made on at the end of each day or other first predetermined period. Also from step 312, the alternative embodiment of FIG. 3 proceeds to step 313. In step 313, the filing, including a transmittal with the authorization for the debit of the requested fee or the check for the requested fee, is sent to the patent or patent and trademark agency. From step 313, the alternative embodiment of FIG. 3 proceeds to step 114 of FIG. 1(a) and FIG. 1(b) or step 214 of FIG. 2(a) and FIG. 2(b), in which step the patent or patent and trademark agency receives the filing and cashes the check against the account maintained by the financing organization with a financial institution or debits the deposit account maintained by the financing organization.

The process of the entry of a fee request in step 310, the workstation electronically contacting the fee computer system in step 311, the workstation issuing the check or authorization in step 312, and the filing including the check or a transmittal with the authorization being mailed to the patent or patent and trademark agency in step 313 is repeated as necessary within a first predetermined period, such as a day. This is represented in step 316. If the end of the day or other first predetermined period has not been reached, the process reverts back to step 310. Thus, in a given day, a number of fees may be requested, approved, issued, and mailed. Once the end of the day or other first predetermined period is reached, the process continues to step 122 of FIG. 1(a) and FIG. 1(b) or step 222 of FIG. 2(a) and FIG. 2(b), in which step an invoice is generated. The alternative embodiment of FIG. 3 ends by continuing with the methods as shown in and described in conjunction with FIG. 1(a) and FIG. 1(b) or FIG. 2(a) and FIG. 2(b).

Exemplary System Architecture of the Present Invention

Figure 4:
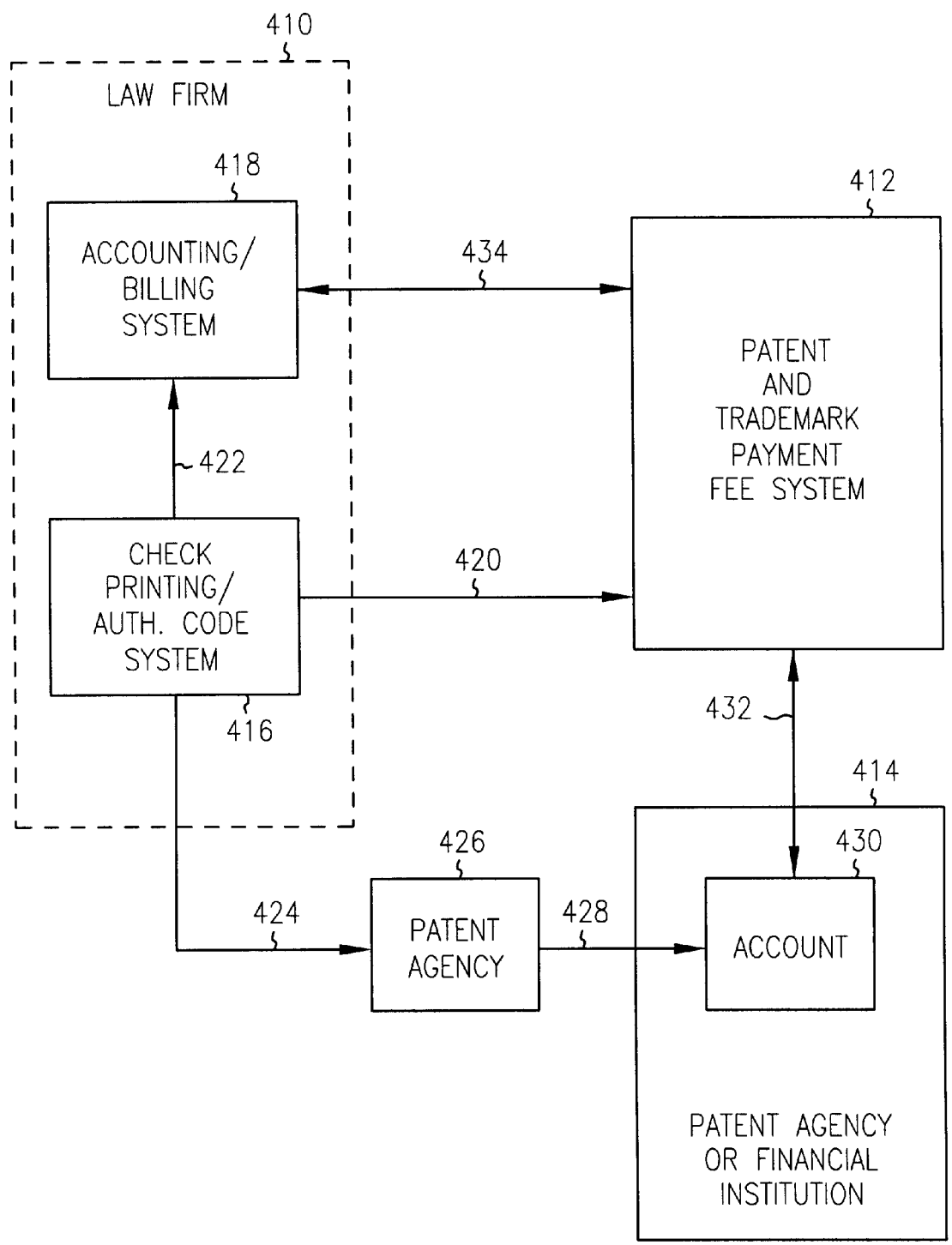
FIG. 4 shows a diagram of an exemplary system architecture in which the preferred methods of the invention may be practiced.

Referring to FIG. 4, a diagram of an exemplary system architecture in which the preferred methods of the invention may be practiced is shown. The exemplary system architecture includes three computer systems: a firm computer system 410 maintained by a firm such as a law firm, such as a networked computer system, a fee computer system 412 maintained by a financing organization separate from the firm (i.e., a first organization), and an account computer system 414 maintained by either a patent or patent and trademark agency or a financial institution (i.e., a second organization). The systems 410, 412 and 414 are preferably physically separate from one another, and communicate with one another electronically as is described.

The firm computer system 410 includes first computer subsystem 416 and second computer subsystem 418. First computer subsystem 416 includes the workstation described in conjunction with the preferred embodiments of the invention of FIG. 1(a), FIG. 1(b), FIG. 2(a), and FIG. 2(b), at which the requested trademark or patent fee is input and stored, and at which the charge for the requested fee (a check or an authorization and code for a debit) is issued. Second computer subsystem 418 includes the firm's accounting system as described in conjunction with the preferred embodiments of the invention of FIG. 1(a), FIG. 1(b), FIG. 2(a), and FIG. 2(b).

Thus, computer system 410 includes preferably a check printer and software in accordance with the methods of the invention as have been described. The software preferably allows entry of a file number for the check or charge to be issued. After the check has been printed, the software is updated to reflect that the check has been issued. In an alternative embodiment, the file number is also printed on the check. Checks may be preprinted to the Patent and Trademark Office (PTO) of the United States, the European Patent Office (EPO), or a PCT office (either U.S. or European); the invention is not so limited. The software may also be allowed to only print checks with PTO, EPO or a PCT office as the payee of the check. The check printer preferably "signs" the checks with a special magnetic ink. The software also preferably prevents the law firm from overdrawing a preset credit limit authorization.

As represented by arrow 420, first computer subsystem 416 communicates electronically with fee computer system 412. Computer subsystem 416 communicates with fee computer system 412 to provide the first information regarding a charge for a requested fee entered at computer subsystem 416, such as the date of the charge, the amount of the charge, the payee patent or patent and trademark agency of the charge, etc., on a daily basis or at the end of another first predetermined period. Computer subsystem 416 also communicates with fee computer system 412 in the alternative embodiment to request approval for a charge before the charge is issued.

Fee computer system 412 preferably has software to download data from firm computer system 410 at the law firm and generate an invoice requiring from the firm a payment in a predetermined period. Preferably, fee computer system 412 also generates reports showing checks and charges issued, as sorted by client. In an alternative embodiment, the software provides output to disk that can be uploaded to a law firm accounting system (such as second computer subsystem 418 of firm computer system 410), or electronically uploads the invoices directly into computer subsystem 418. Fee computer system 412 also preferably has software to upload daily account data to firm computer system 410 to indicate to system 410 how much credit is available to the firm.

The software of fee computer system 412 also preferably keeps track of deposit accounts or other accounts, and can receive from firm computer system 410 preferably via an electronic upload data showing what the firm authorized for deposit the previous day. The software preferably generates a report showing what needs to be transferred into the deposit account, or electronically links to a financial institution requesting a wire transfer of sufficient funds. The software also preferably includes records of daily balances in its account as received from a patent agency such as the United States Patent and Trademark Office, and reconciles this balance with its own expected balance. The software is preferably able to track multiple deposit accounts with a given patent agency or numerous patent agency. When uploading data to second computer subsystem 418 of firm computer system 410, fee computer system 412 first reformats the data to ensure that it is compatible with subsystem 418. The software of fee computer system 412 tracks credit limits, collection of invoices, and maintains balances, as has been described.

As represented by arrow 422, first computer subsystem 416 also communicates electronically with second computer subsystem 418, to provide second computer subsystem 418 with an electronic fee invoice of the charges issued by the first computer subsystem 416. Preferably, the transmission of electronic invoices from first computer subsystem 416 to second computer subsystem 418 is accomplished on a daily basis, but may also be accomplished at the end of an alternative first predetermined period as well.

Arrow 424 represents the delivery of the charge from first computer subsystem 416 to patent or patent and trademark agency 426. Patent or patent and trademark agency 426 is an agency such as the USPTO, EPO, PCTO, etc. The delivery of the charge is typically performed via next-day mail. The patent or patent and trademark agency thus receives the charge as either a transmittal including an authorization and optionally a debit for debit from a deposit account maintained by the financing organization maintaining fee computer system 412 with patent or patent and trademark agency 426, or as a check payable against an account maintained by the financing organization maintaining fee computer system 412 with a financial institution such as a bank.

Arrow 428 represents the debit for the fee or the cashing of the check for the fee by patent or patent and trademark agency 426 from account 430, as electronically maintained within account computer system 414 (i.e., data stored within system 414 representing account 430). In the case where arrow 428 represents the debit for the requested patent or trademark fee, account 430 is a deposit account maintained by the financing organization maintaining fee computer system 412, and account computer system 414 is itself ultimately maintained by patent or patent and trademark agency 426. In the case where arrow 428 represents the cashing of the check for the requested patent or trademark fee, account 430 is an account maintained by the financing organization maintaining fee computer system 412 with a financial institution, and account computer system 414 is maintained by the financial institution.

Arrow 432 represents the flow of information and funds between the financing organization as represented by the financing organization's fee computer system 412, and the financial institution or patent or patent and trademark agency 426 as represented by the account computer system 414. As first computer subsystem 416 provides fee computer system 412 first information regarding the charge issued at first computer subsystem 416 (represented by arrow 420), the financing organization transfer funds to account 430 maintained by account computer system 414 to cover the charges. Thus, arrow 432 first represents the flow of money from the financing organization to patent or patent and trademark agency 426 or the financial institution maintaining account computer system 414. Preferably, the transfer of funds is initiated by fee computer system 412 such that no human involvement is necessary. The transfer of funds may be accomplished by a wire transfer, or other manner; the invention is not so limited. As described in conjunction with the preferred methods of the invention, the depositing of funds is preferably accomplished on a daily basis, but may also be accomplished at the end of a different first predetermined period as well, or as each charge is requested.

Furthermore, at the end of every month or other second predetermined period, account computer system 414 delivers to the financing organization a statement of the transactions made to account 430 during that month or other second predetermined period. The statement delivery may be accomplished electronically, directly from account computer system 414 to fee computer system 412, in an electronic format readable by system 412. Alternatively, the statement may be printed on paper by account computer system 414, mailed to the financing organization maintaining fee computer system 412, and input into computer system 412. Thus, arrow 432 represents the delivery of the statement from patent or patent and trademark agency 426 or the financial institution maintaining account computer system 414 to the financing organization maintaining fee computer system 412. The statement includes second information regarding the charges, such as the authorization (and optionally authorization code) or check number, the date the charge was paid or debited, the date the charge was requested, the amount of the charge, etc.

Both fee computer system 412 and account computer system 414 are typical computer systems including one or more processors, memory, such as read-only memory (ROM) and random-access memory (RAM), one or more storage devices, such as hard disk drives (HDD), floppy disk drives (FDD), optical drives, and tape-cartridge drives, one or more input devices, such as optical character recognition devices (OCR), keyboards, and mouses, and one or more output devices, such as laser and ink jet printers, and display monitors.

In addition, because the systems preferably require electronic communication with each other and, in the case of fee computer system 412, with firm computer system 410 as well, each also includes such as means for electronic communication. This may include a modem or other communication device for communicating over a preexisting communications network such as a public telephone switched network (PTSN) or an integrated services digital network (ISDN), or a connection to the Internet. It is noted that the hardware implementation of firm computer system 410 is described in the next section.

Finally, arrow 434 represents communication between second computer subsystem 418 of firm computer system 410 and fee computer system 412 maintained by the financing organization. This communication includes the delivery of the firm invoice for the fees paid on behalf of the firm's clients by the financing organization, from the financing organization to the firm. The delivery may be electronic, such that the invoice is directly transmitted from fee computer system 412 to second computer subsystem 418. Alternatively, the invoice may be a paper invoice, mailed from the financing organization to the firm, which inputs it into second computer subsystem 418 via keyboard entry or optical character recognition (OCR). The delivery of the invoice by the financing organization is performed after fee computer system 412 has reconciled the second information regarding the charges received from patent or patent and trademark agency 426 or the financial institution maintaining account computer system 414 with the first information regarding the charges received from first computer subsystem 416.

Second computer subsystem 418 also generates a client invoice including the fee invoices generated at first computer subsystem 416, for delivery to the client. The client invoice correspond to the firm invoice such that payment by the client to the firm for the firm invoice is used as payment by the firm to the financing organization for the firm invoice. That is, once the firm receives payment for the client invoice, it is able to pay the firm invoice delivered to it by the financing organization.

Arrows 420 and 434 may both indicate electronic communication between firm computer system 410 and fee computer system 412. The arrows are indicated separately in FIG. 4 to show that each arrow represents the transmission of different data to a different computer subsystem of computer system 412. However, the arrows do not necessarily indicate that separate communications modes are used to transmit the information as represented by arrow 420 and as represented by arrow 434. That is, first computer subsystem 416 when communicating as represented by arrow 420, and second computer subsystem 418 when communicating as represented by arrow 434, may nevertheless utilize the same modem, or the same Internet connection, of firm computer system 410. Alternatively, each computer subsystem may utilize different modems, or different Internet connections.

The system architecture of FIG. 4 performs the preferred methods of the invention as follows. A charge for a requested trademark or patent fee, such as a check or an authorization for a debit from a deposit account, is requested at first computer subsystem 416. First computer subsystem 416 issues the charge, which is then delivered to patent or patent and trademark agency 426 as represented by arrow 424. On preferably a daily basis, first computer subsystem 416 sends an electronic invoice of the day's charges to second computer subsystem 418, as represented by arrow 422. Also on preferably a daily basis, first computer subsystem 416 seconds first information regarding the day's charges to fee computer system 412. Fee computer system 412 then specifies or effects the depositing of sufficient funds into account 430 to cover the charges, as represented by arrow 432. Patent or patent and trademark agency 426, upon receiving the charge as represented by arrow 424, cashes the check against account 430, or debits account 430, as represented by arrow 428.

On preferably a monthly basis, patent or patent and trademark agency 426 or the financial institution maintaining account computer system 414 sends a statement regarding that month's transactions made to account 430 to the financing organization maintaining computer system 412, as also represented by arrow 432. Fee computer system 412 reconciles the second information within the statement with the first information previously received from firm system 410, and finally sends an invoice to the firm for the month's charges, as represented by arrow 434. Second computer subsystem 418 generates a client invoice, which includes the fee invoices generated by first computer subsystem 416, and which is delivered to the client. The client's payment of this invoice is then used by the firm to pay the firm invoice, the client invoice corresponding to the firm invoice.

Figure 5:
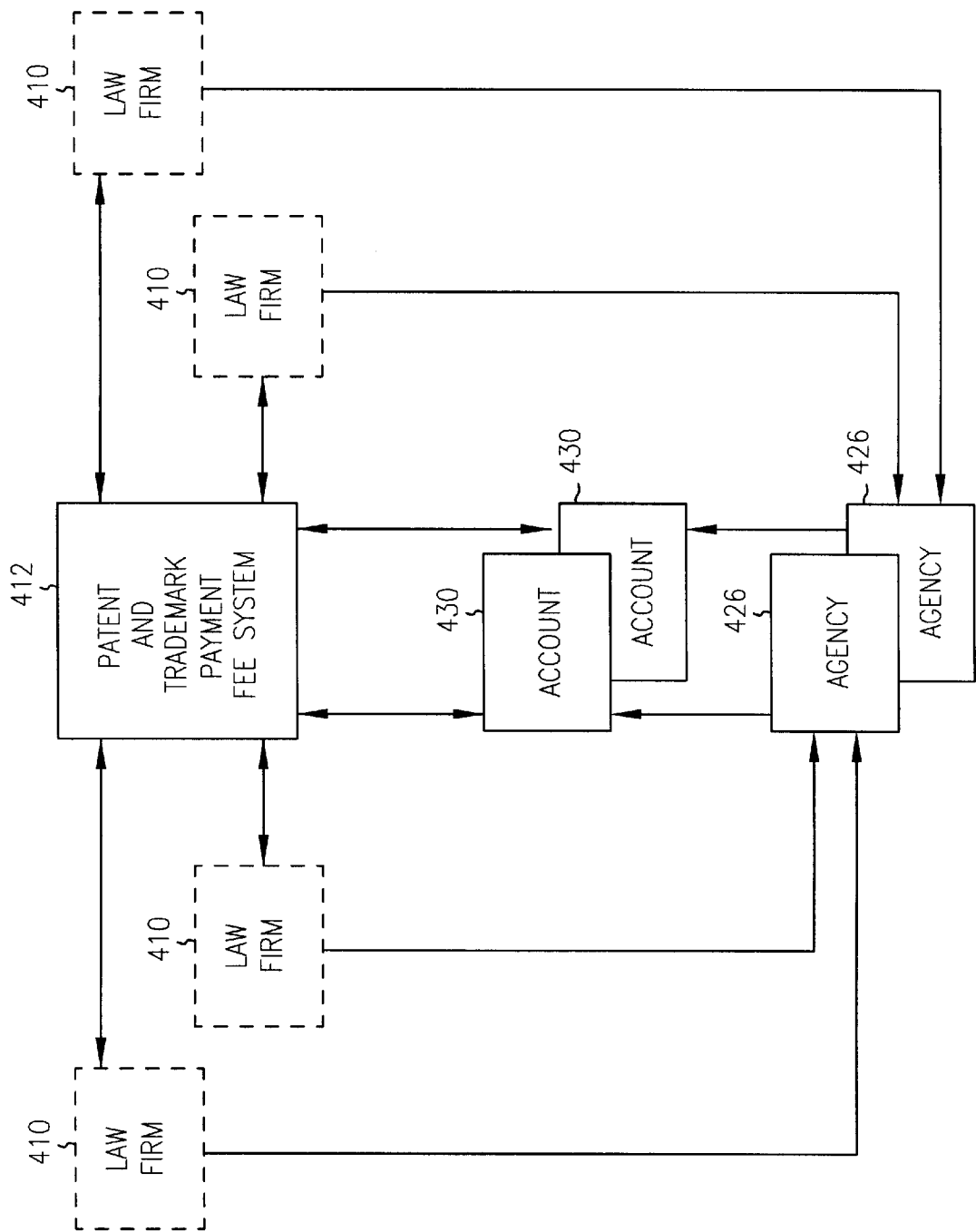
FIG. 5 shows a diagram of another exemplary system architecture in which the preferred methods of the invention may be practiced.

As has been described in conjunction with and shown in FIG. 4, the fee computer system of the financing organization interacts with one firm and one patent or patent and trademark agency. The limitation to one firm and one patent or patent and trademark agency in FIG. 4 is for purposes of clarity only, however. The invention is not so limited. Referring now to FIG. 5, a diagram of an exemplary system architecture in which the fee computer system of a financing organization handles multiple firms and patent and trademark agencies is shown. Fee computer system 412 thus receives first information from and sends firm invoices to a number of firms each maintaining a firm computer system 410. Each firm is able to send a patent or trademark filing including a charge to any of a number of patent agencies 426. Each of the patent agencies 426 is able to cash checks against one of a number of accounts 430, or to debit one of a number of accounts 430. Finally, the financing organization is able to transfer funds to any of the accounts 430.

In other words, the fee computer system of the financing organization is able to handle the advancement of fees on behalf of the clients of more than one law firm, for payment to more than one patent or patent and trademark agency. Each law firm 410, for example, may correspond with a number of different patent agencies 426, such as the USPTO, the EPO, a PCTO, etc. The financing organization may have a specific account 430 for each firm 410, or it may have a specific account 430 for each agency 426, or it may have only account 430. That is, the manner in which the financing organization maintains one or more accounts 430 to accommodate the advancement of fees on behalf of the clients of more than one firm 410 is not limited by the present invention.

An exemplary system architecture in which the preferred methods of the invention may be practiced has been described. The exemplary system architecture has been shown in detail in conjunction with one firm and one patent or patent and trademark agency in FIG. 4. The exemplary system architecture has been shown in conjunction with more than one firm and more than one patent or patent and trademark agency in FIG. 5.

Figure 6:
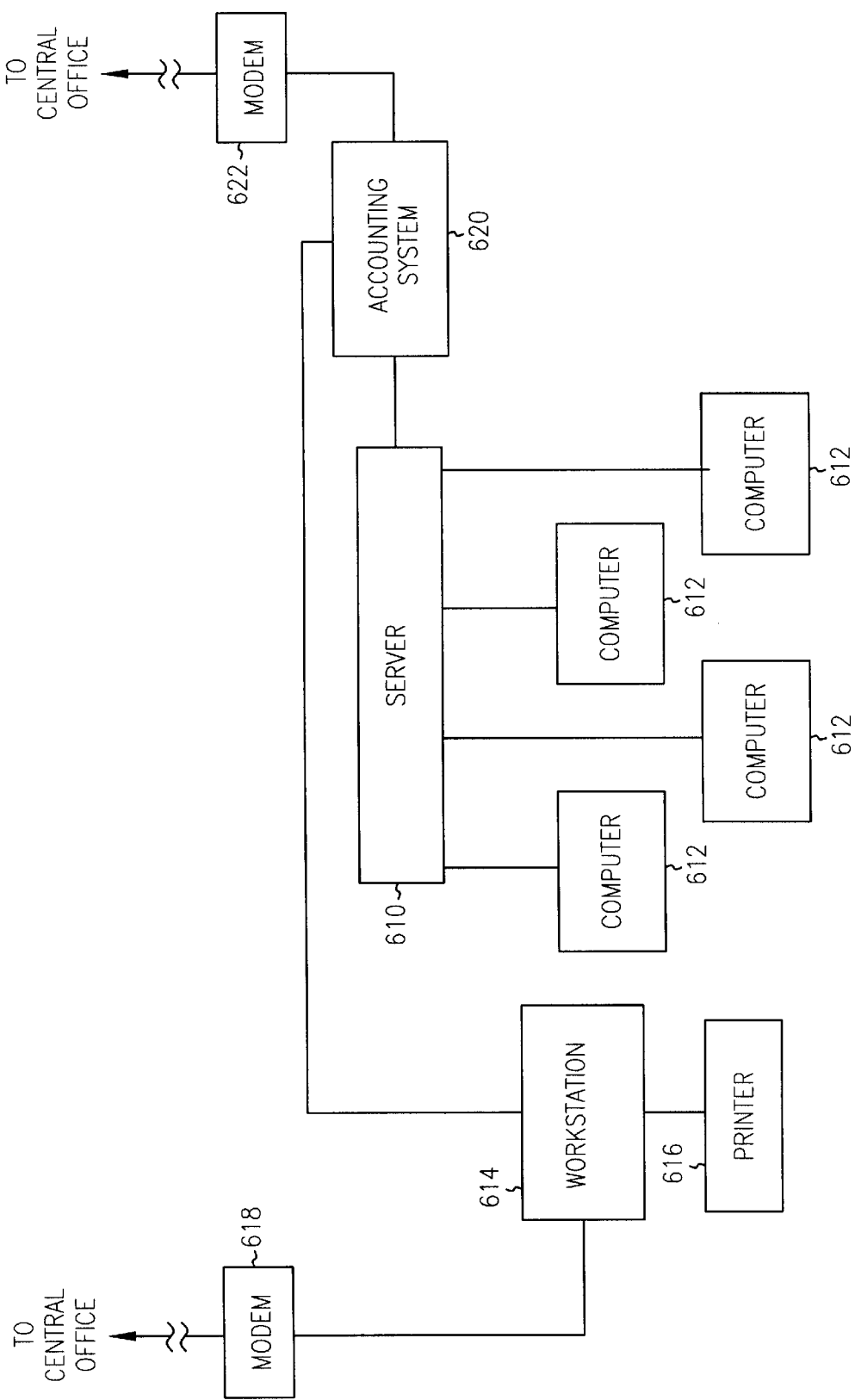
FIG. 6 shows a first exemplary hardware implementations of a firm computer system of the present invention.
Figure 7:
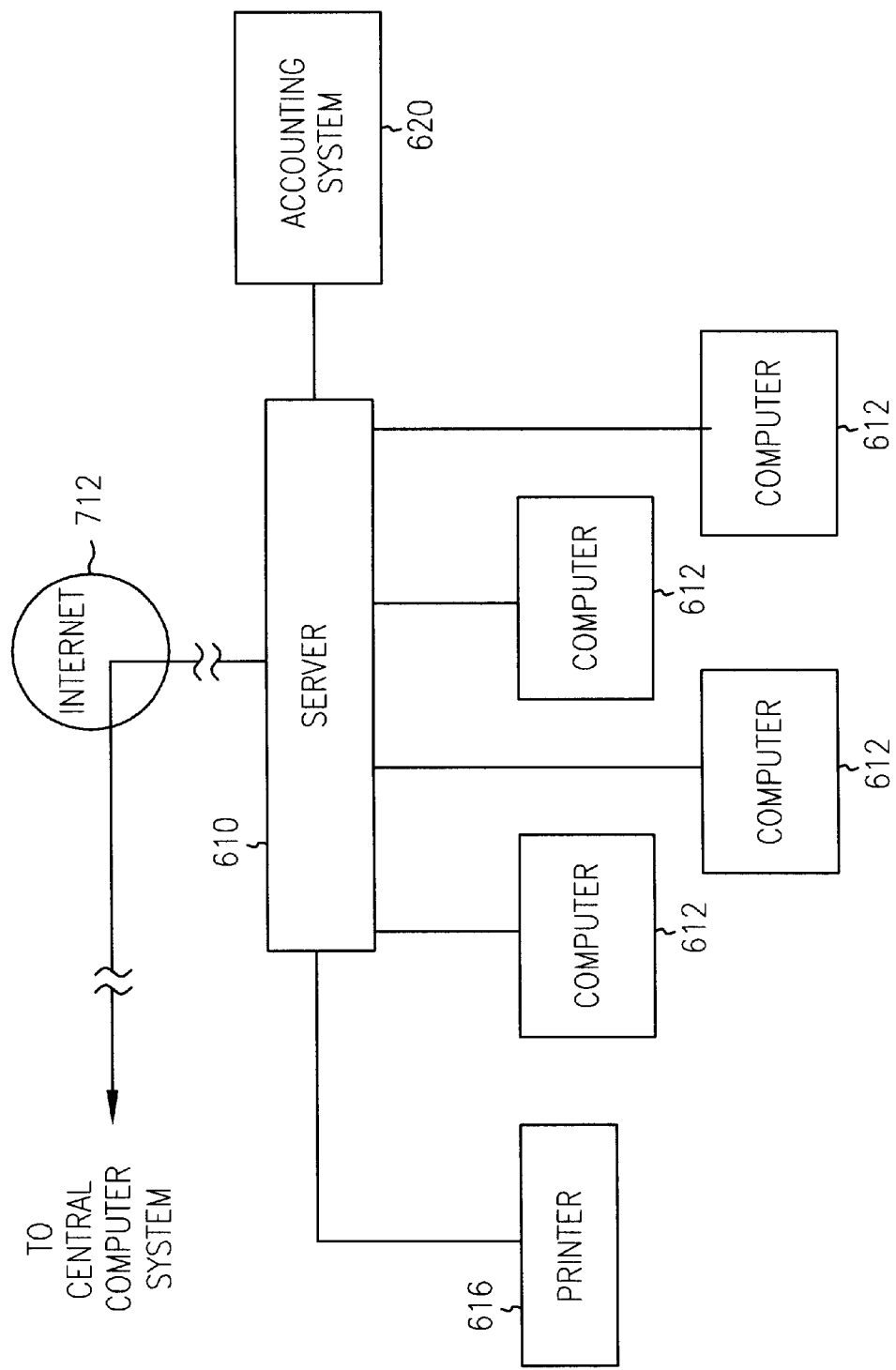
FIG. 7 shows a second exemplary hardware implementation of a firm computer system of the present invention.
Figure 8:
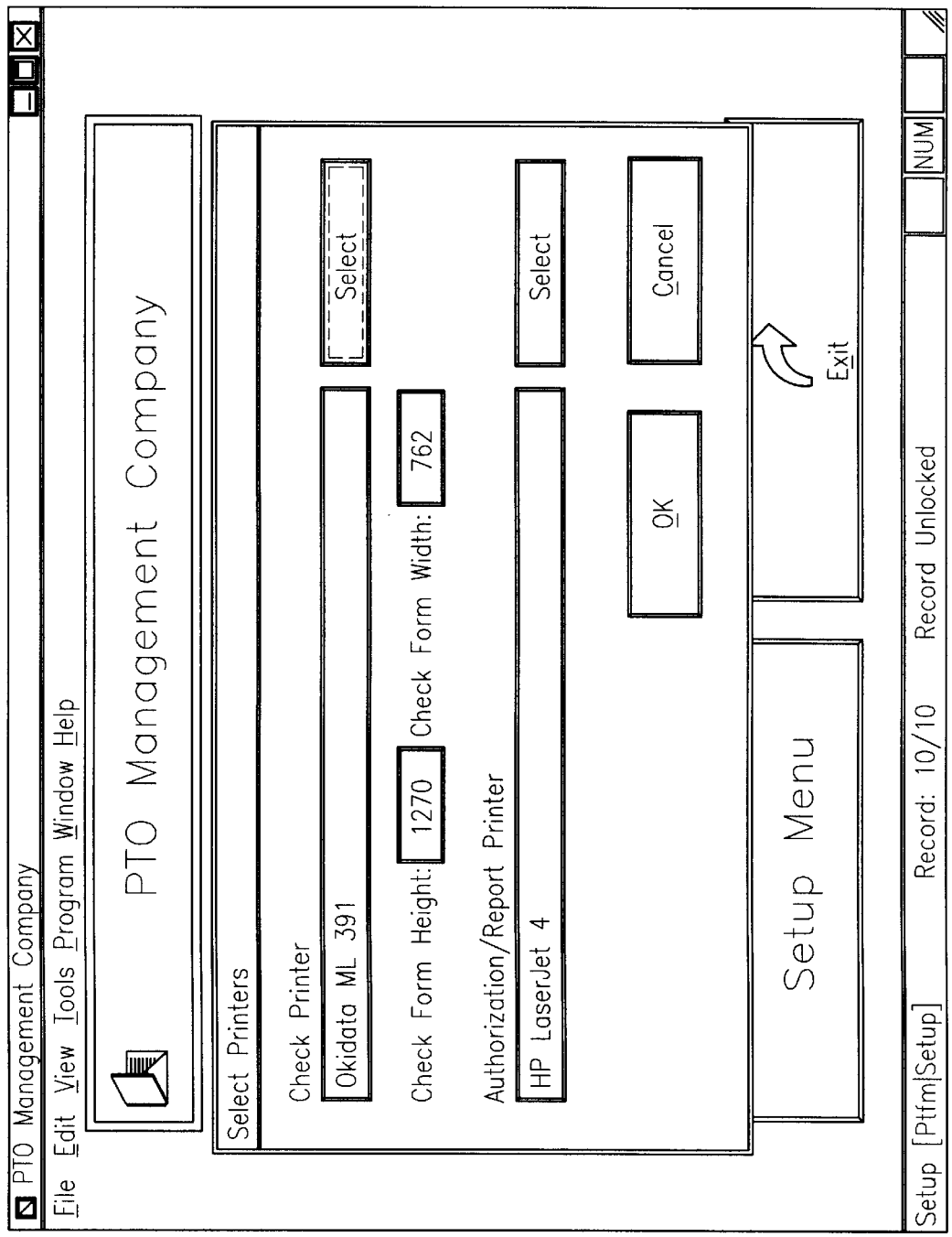
Figure 9:
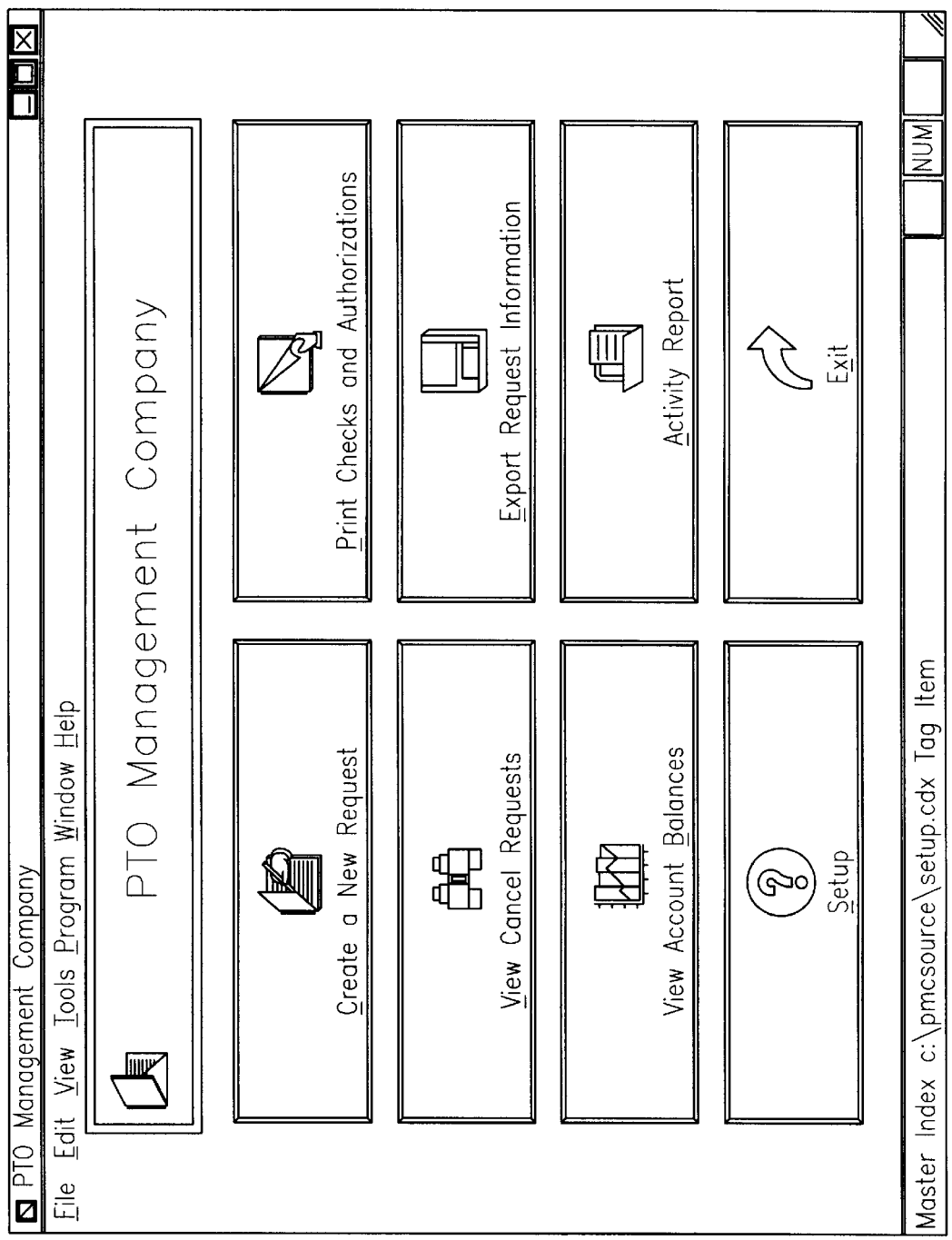
Figure 11:
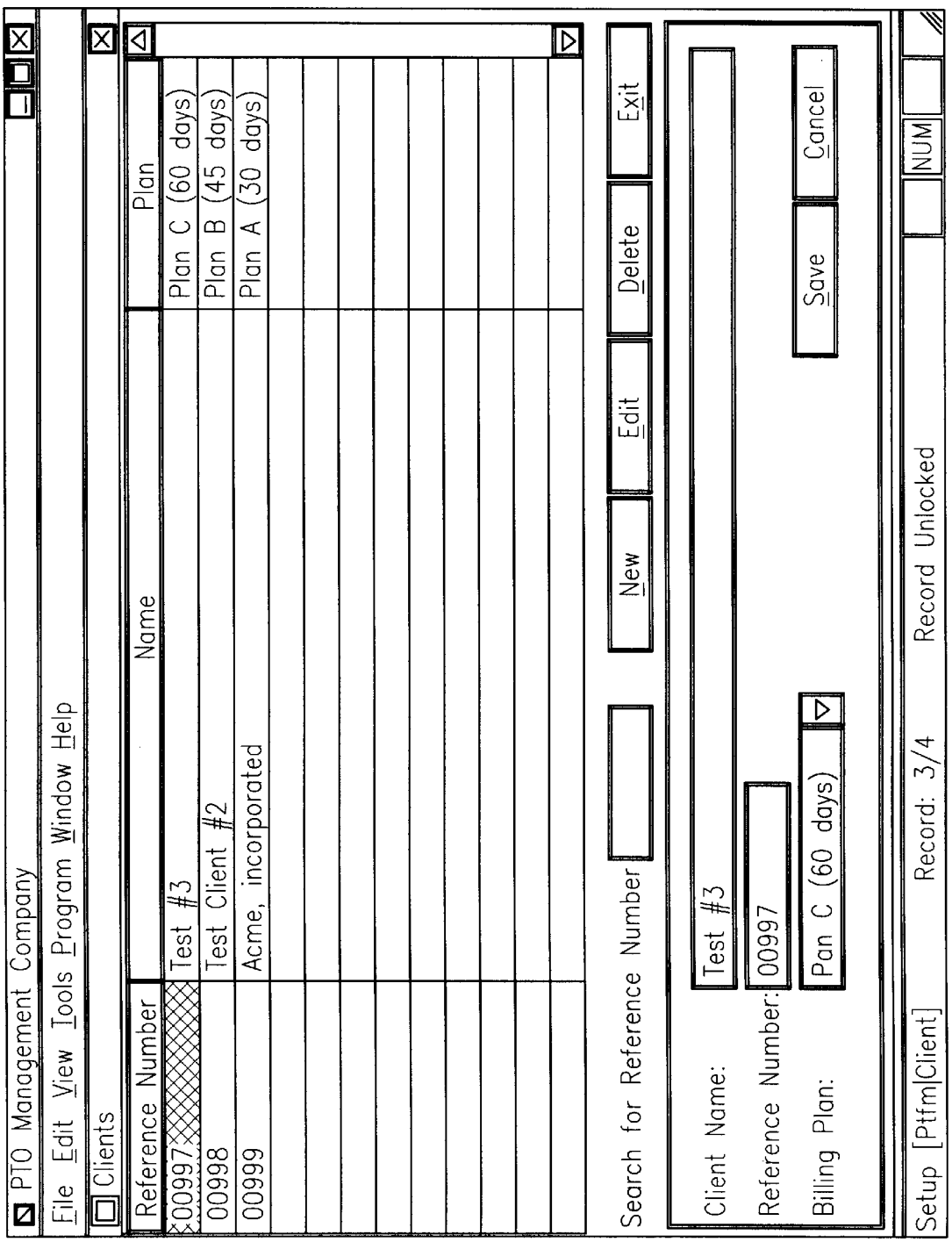
Figure 12:
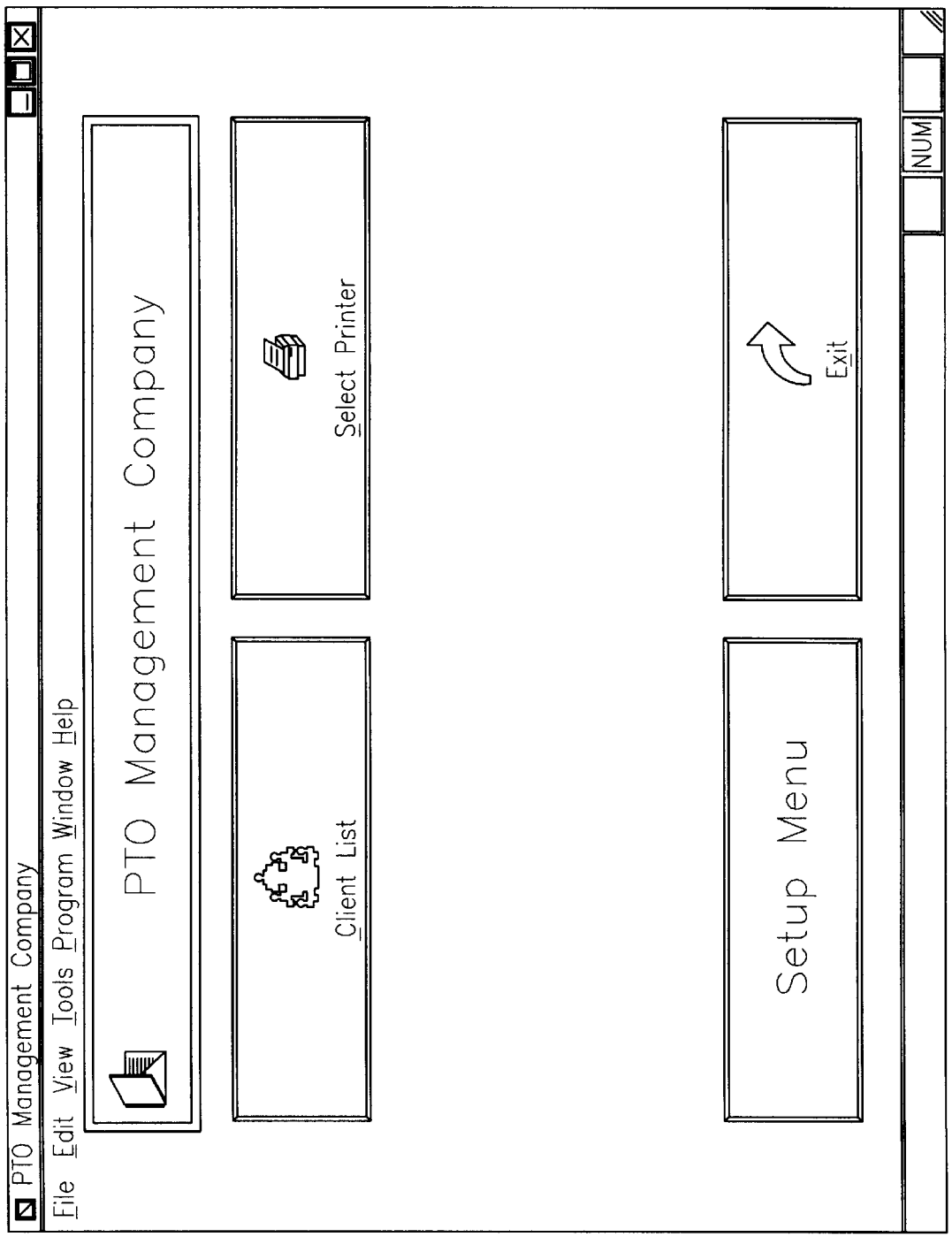
Figure 13:
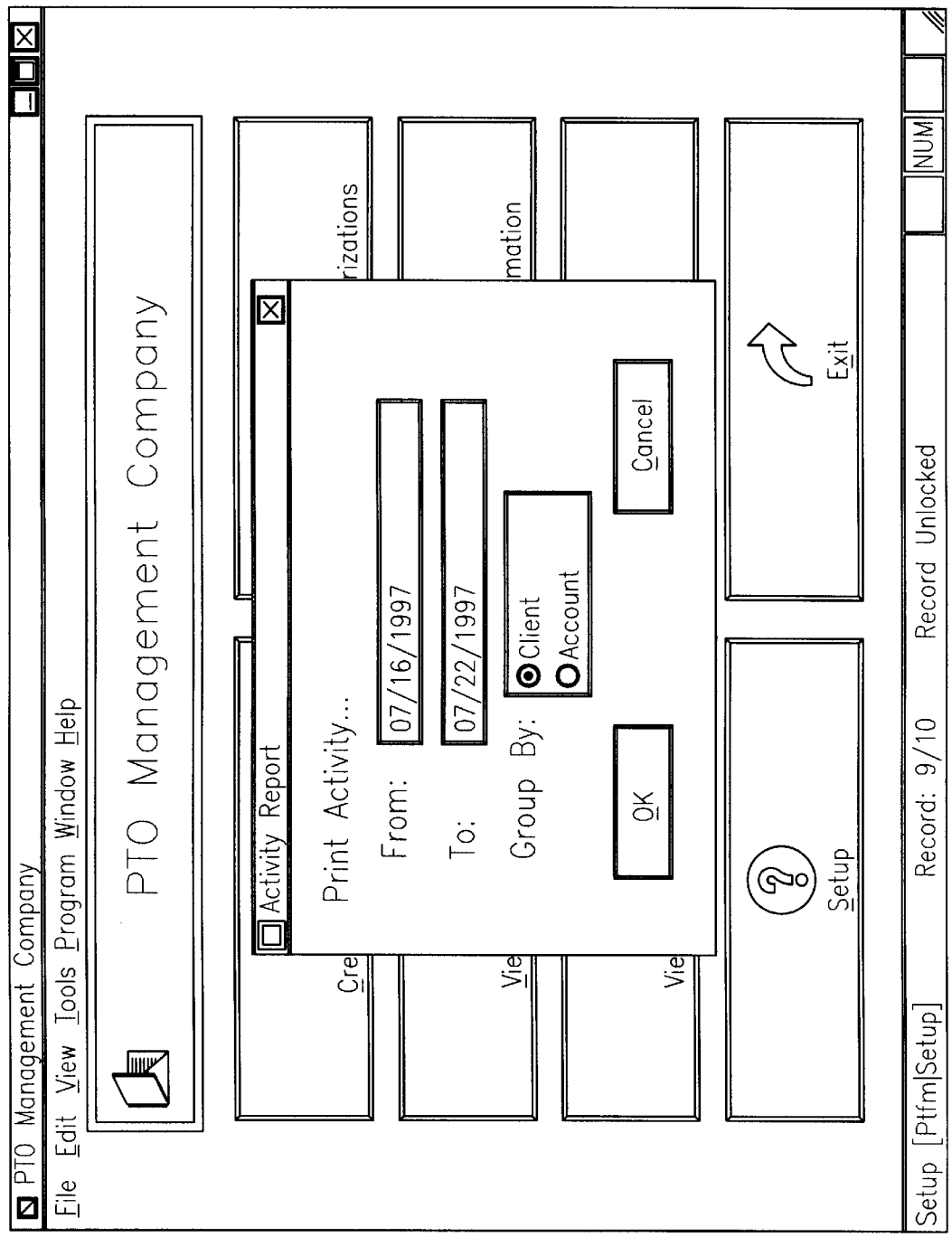
Figure 15:
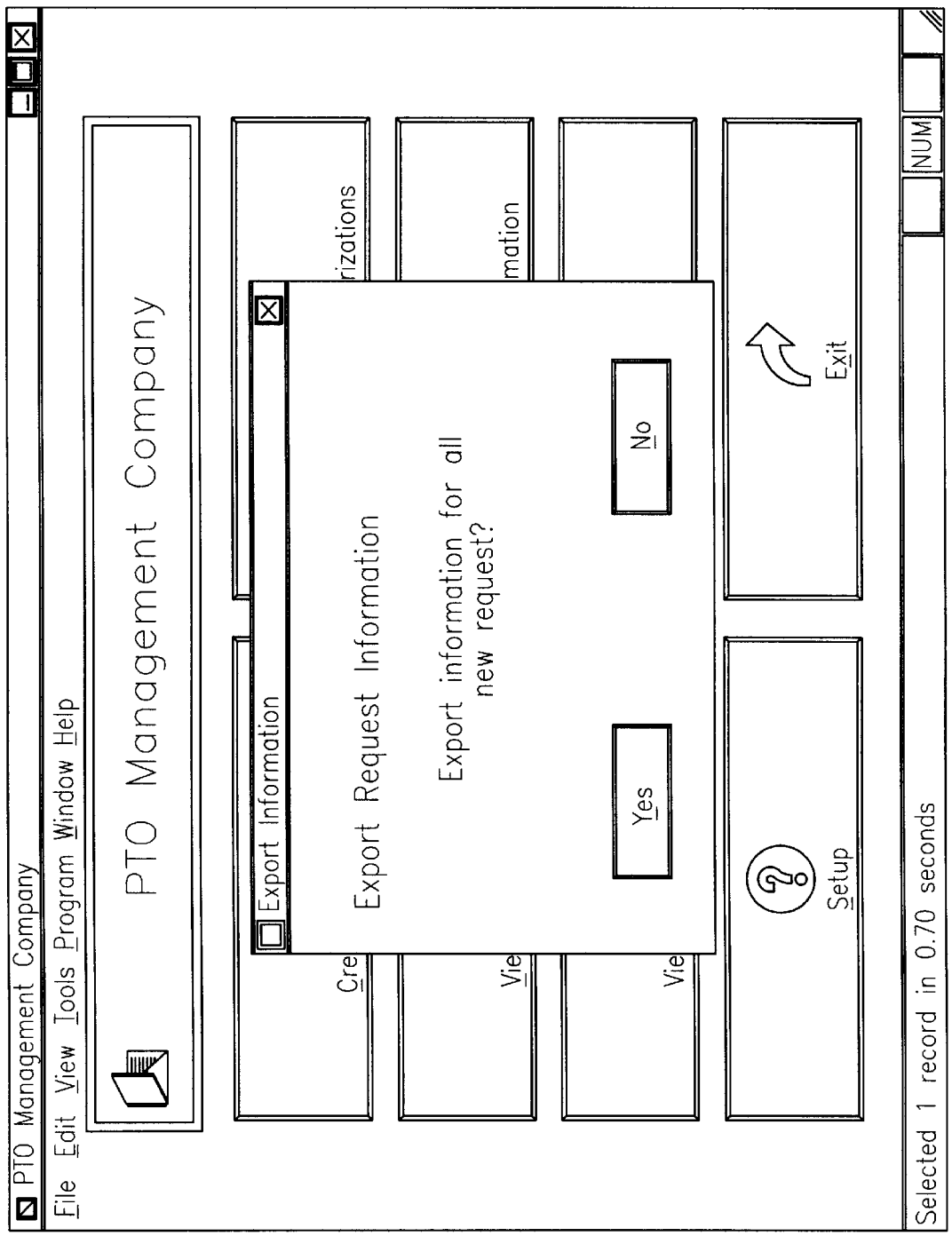

Exemplary Hardware Implementations of the Firm Computer System of the Present Invention Referring to FIG. 6 and FIG. 7, two exemplary hardware implementations of the firm computer system of the present invention are shown. In the hardware implementation of FIG. 6, the workstation at which a charge for a requested trademark or patent fee is issued is a stand-alone computer. In the hardware implementation of FIG. 7, the workstation is any computer within the firm computer system. It is noted that the hardware implementations shown in FIG. 6 and FIG. 7 are exemplary, and the invention is not so limited to either hardware implementation.

Referring specifically to FIG. 6, the firm computer system includes a local-area network (LAN) having a server 610 coupling together a plurality of computers 612. The network may be any type of network, such as an Ethernet network, a token-ring network, etc. Each of the server 610 and computers 612 includes a processor (such as an Intel Pentium processor), random-access memory (such as thirty-two megabytes of memory), read-only memory, one or more storage devices (such as a hard disk drive (HDD), a floppy disk drive (FDD), a tape cartridge drive, and an optical drive), one or more input devices (such as a keyboard, a mouse, and a scanner), and one or more output devices (such as a printer, and a display monitor). Each of the server 610 and computers 612 runs an operating system, such as a version of Microsoft Windows. The primary difference between server 610 and computers 612 is that typically server 610 is more powerful, to handle the demands of the network.

Workstation 614 is also a computer similar to computers 612. Workstation 614 is the workstation as has been described in conjunction with the preferred embodiments, at which charges are requested and issued. Workstation 614 is comprised within the first computer subsystem of the exemplary system architectures, as has been described. Workstation 614 may not be attached to server 610 like computers 612 for security reasons. That is, in a large firm environment having a number of computers 612, it may be desirable to have a separate workstation 614 so that firm personnel are forced to enter in their charge requests on a separate machine, such that the workstation 614 may be monitored by a specific firm personnel (such as an accountant, etc.).

In an alternative embodiment, charge requests may be generated at any of computers 612, but the requests are pooled at workstation 614, so that the accounting department of the firm may monitor the charges that have been requested, and finalize or approve their issuance. In this embodiment, security is maintained because no charges are issued until a central authority approves them, but convenience is provided for by permitting any user of the law firm to request a charge without having to leave a particular computer 612. Workstation 614 may itself be physically located in the firm's accounting department, the firm's docketing department, the firm's mail room, etc.

Workstation 614 is specifically shown in FIG. 6 as coupled to printer 616. Printer 616 may be a laser printer or an ink jet printer. In one embodiment of the invention, printer 616 is utilized to print checks for the requested patent and trademark fees. The checks may be printed on blank check printing stock, for ease of use and maintenance, using a special magnetic ink installed in printer 616. Such magnetic ink is commercially available. Alternatively, the checks may be preprinted as payable to a particular patent or patent and trademark agency, and the printer only prints the date, number, and amount of the fee on the check.

Workstation 614 is also specifically shown in FIG. 6 as coupled to modem 618. The invention is not limited to any particular modem 618, but in one embodiment modem 618 communicates at 28,800 baud over a PTSN, and in another embodiment communicates at 56,000 baud over an ISDN, as known within the art. Modem 618 is utilized by workstation 614 to communicate with the fee computer system, which would also have a modem communicatively compatible with modem 618.

Workstation 614 is also coupled to accounting system 620. Accounting system 620 is the accounting system as has been described in conjunction with the preferred methods that receives electronic invoices from workstation 614. Accounting system 620 is comprised within the second computer subsystem of the firm computer system as has been described in conjunction with the exemplary system architectures. Accounting system 620 is also a computer of a type such as computers 612 are. As shown, accounting system 620 is directly connected to workstation 614; however, it may also be connected to workstation 614 through server 610. Accounting system 620 is preferably connected to server 610, although this is not required. If for security reasons such connection is not desirable, then accounting system 620 need not connect to server 610.

As shown in FIG. 6, accounting system 620 is coupled to modem 622. The invention is not limited to any particular modem 622, but in one embodiment modem 622 communicates at 28,800 baud over a PTSN, and at 56,000 baud over an ISDN in another embodiment, as known within the art. Modem 622 is utilized by accounting system 620 to communicate with the fee computer system, which would also have a modem communicatively compatible with modem 622. Although as shown in FIG. 6, each of workstation 614 and accounting system 620 has a separate modem, in one embodiment, both share a single modem to communication with the fee computer system of the financing organization.

Referring next to FIG. 7, another exemplary hardware implementation of the firm computer system is shown. Like the firm computer system of FIG. 6, the firm computer system of FIG. 7 includes a server 610, a plurality of computers 612, a printer 616, and an accounting system 620. However, the firm computer system of FIG. 7 does not include a dedicated workstation 614. Rather, each of computers 612 includes functionality to serve as workstation 614. That is, each of computers 612 is amenable to input of a requested charge for a patent or trademark fee, which is then issued by the particular computer 612 and printed on printer 616 as has been described. This hardware implementation is desirable in small firms not having a large number of computers 612, and thus not having the security issues that may be present in large firms have a large number of computers 612.

In addition, communication between the firm computer system and the fee computer system of the financing organization in FIG. 7 is accomplished over the Internet, as opposed to direct modem-to-modem communication as in FIG. 6. Specifically, server 610 has a connection to the Internet 712, to which the fee computer system of the financing organization also has a connection. The invention is not limited to the manner by which the server or the fee computer system is connected to the Internet.

Two exemplary hardware implementations have been described. It is noted that the invention is not so limited to either hardware implementation. For example, the basic hardware implementation of FIG. 6, but with Internet communication to the fee computer system of the financing organization, is also amenable under the invention. For further example, the basic hardware implementation of FIG. 7, but with direct modem-to-modem communication with the fee computer system of the financing organization, is amenable under the invention as well.

Additional Functionality Provided by Alternative Embodiments

The preferred methods, exemplary system architecture, and exemplary hardware implementation of the present invention have been described. Specifically, a computerized method and system in which a patent or trademark fee for a client of a firm is charged against an account maintained by a financing organization separate from the firm has been described. It is contemplated that other functionality is provided by alternative embodiments of the invention.

In a first alternative embodiment of the invention, the firm personnel entering in the charge request at the workstation is able to flag that the requested charge should be payable against the firm's own account (either a deposit account, or by printing check cashable against the firm's account with a financial institution). This is desirable where the firm wants to finance the fee itself or believes for whatever reason that the client for which the fee is being advanced will not be able to repay the fee. In this situation, the firm desires to pay the fee itself so that it will not also have to also pay the service charge exacted by the financing organization in paying the fee on behalf of the client.

Furthermore, when the firm's own deposit account is utilized, in a second alternative embodiment of the invention, the client's fees are still financed by the financing organization, such that the financing organization deposits funds into the firm's own deposit account, and then exact a service charge against the client as before.

In a third alternative embodiment of the invention, the fee computer system of the financing organization downloads on a monthly basis, or at the end of a second predetermined period, the firm's monthly billing records, to ensure that the charges for the patent and trademark fees, along with their corresponding service charges, were properly billed to the firm's clients. This is desirable as a further measure to prevent fraud on the financing organization, and also as a service to the law firm that it is billing its clients correctly.

In a fourth alternative embodiment of the invention, the clients are billed a service charge for patent and trademark fees advanced on their behalf to a patent or patent and trademark agency according to their classification, the particular scheme of which is not limited by the invention. For example, larger or otherwise more creditworthy clients may be charged less of a service charge than smaller or otherwise less creditworthy clients for the same patent or trademark fee advanced on their behalf.

In a fifth alternative embodiment, the firm personnel inputting a requested charge for a patent or trademark fee may divide how the fee is to be paid. For example, an extension fee is occasionally paid for by the firm, not the client whose matter the fee relates to. In such instance, the firm personnel may specify that the extension fee is to debited from the firm's deposit account, or paid for by a check cashable against the firm's financial account, whereas any other fees are to be advanced by the financing organization separate from the firm, as has been described herein. For further example, additional fees may be charged to a second deposit account, to segregate errors from authorizations, and assuring payment of issue fees and other fees.

In a sixth alternative embodiment, the patent and trademark fee payment system and method described in previous sections of the detailed description is modified to submit payment to a foreign firm associated with the law firm, instead of to a patent agency. However, because payment terms to such foreign firms do not typically require immediate payment, in such an alternative embodiment, the payment to the foreign firm is submitted after a predetermined period following the request. In other aspects, however, this embodiment of the invention operates as has been described in previous sections of the detailed description. The term agency as used in this application, therefore, is meant to cover such foreign associate firms, as well as other firms and entities, in addition to patent and patent or trademark agencies such as the USPTO, the EPO, etc.

As an example of this embodiment, a law firm may request payment on June 1 for a foreign associate invoice. The financing organization would issue an authorization and commit to pay this invoice on October 30, with payment due December 30. On October 30, the system will generate a check to pay the invoice. However, the law firm may immediately invoice its client in June for the law firm's obligation to repay the financing organization on December 30. Therefore, the firm will receive payment from its client for the foreign associate invoice even prior to the finance organization issuing a charge for the foreign associate fees, which is beneficial to the firm.

In a seventh alternative embodiment, the invention provides for the capability of tracking retainer balances for the clients of a firm. Therefore, when a charge request is made, the request can denote whether the charge should be made as has been described (i.e., advanced by a financing organization, etc.), or whether the charge should be paid from the retainer balance, and the retainer balance decreased accordingly. In such an embodiment, the printing of a check may be performed a printer separate from the printer used to print checks payable against an account maintained by the financing organization, although the invention is not necessarily so limited.

In an eighth alternative embodiment, the invention enables firm personnel to receive an authorization for a charge, and then afterwards (such as one or two days after receiving the authorization and mailing the associated transmittal) request that the system print a check payable to a patent agency to deposit funds to cover the charge. For example, a firm personnel on a first day may receive an authorization code for a debit of the deposit account for the filing fee associated with a patent application to the United States Patent and Trademark Office. On the next day, this debit would be flagged by the system and called to the attention OF firm personnel who could then request that the system print a check payable to a deposit account with the patent agency to cover the debit. The deposit account may be the financing organization's or the firm's; furthermore, the check may be payable against a financial account maintained by either the financing organization or the firm. The invention is not so limited.

Software Listing

The following is a software listing of a preferred embodiment of the invention, as will be appreciated by understood by those of ordinary skill in the art. The software listing is written in Microsoft Fox Pro. In addition, FIGS. 8, 9, 10, 11, 12, 13, 14, 15, 16 and 17 show screen shots from an exemplary embodiment of the invention, while FIGS. 18, 19, 20, 21, 22 and 23 show forms and reports from an exemplary embodiment of the invention.

Database: PTFM

| Field | Field Name | Width | Dec | Index | Type | Collate | Nulls |
|---|---|---|---|---|---|---|---|
| | Structure for table: | | | C:\PMCSOURCE\ACCOUNT.DBF | | | |
| | Number of data records: | 9 | | | | | |
| | Date of last update: | 07/15/1997 | | | | | |
| | Code Page: | 1252 | | | | | |
| 1 | AC_CODE | 8 | | Asc | Character | Machine | No |
| 2 | AC_NAME | 30 | | Asc | Character | Machine | No |
| 3 | AC_CLIENTNUM... | 10 | | | Character | | No |
| 4 | AC_CLIENTNAM... | 50 | | | Character | | No |
| 5 | AC_ACCOUNTNU... | 20 | | | Character | | No |
| 6 | AC_ACCOUNTTY... | 18 | | | Character | | No |
| 7 | AC_BALANCE | 12 | 2 | | Numeric | | No |
| 8 | AC_NEXTCHECK | 10 | | | Numeric | | No |
| | ** Total ** | 159 | | | | | |
| | Structure for table: | | | C:\PMCSOURCE\ACCTTYPE.DBF | | | |
| | Number of data records: | 9 | | | | | |
| | Date of last update: | 06/10/1997 | | | | | |
| | Memo file block size: | 64 | | | | | |
| | Code Page: | 1252 | | | | | |
| 1 | AT_TYPE | 18 | | | Character | | No |
| 2 | AT_KEEPBALAN... | 1 | | | Logical | | No |
| 3 | AT_TRANSTYPE... | 4 | | | Memo | | No |
| 4 | AT_PAYEES | 4 | | | Memo | | No |
| 5 | AT_CANEXCEED | 1 | | | Logical | | No |
| 6 | AT_CHARGEFEE | 1 | | | Logical | | No |
| 7 | AT_CHECKONLY | 1 | | | Logical | | No |
| 8 | AT_AUTHORIZA... | 1 | | | Logical | | No |
| 9 | AT_USPTOCODE | 1 | | | Logical | | No |
| 10 | AT_EPOCODE | 1 | | | Logical | | No |
| 11 | AT_EXPORTTOP... | 1 | | | Logical | | No |
| | ** Total ** | 35 | | | | | |
| | Structure for table: | | | C:\PMCSOURCE\CLIENT.DBF | | | |
| | Number of data records: | 4 | | | | | |
| | Date of last update: | 06/20/1997 | | | | | |
| | Code Page: | 1252 | | | | | |
| 1 | CL_CLIENTNUM... | 10 | | | Character | | No |
| 2 | CL_NAME | 50 | | | Character | | No |
| 3 | CL_PLAN | 20 | | | Character | | No |
| | ** Total ** | 81 | | | | | |
| | Structure for table: | | | C:\PMCSOURCE\DETAIL.DBF | | | |
| | Number of data records: | 69 | | | | | |
| | Date of last update: | 07/15/1997 | | | | | |
| | Memo file block size: | 64 | | | | | |
| | Code Page: | 1252 | | | | | |
| 1 | DE_CODE | 8 | | | Character | | No |
| 2 | DE_CLIENTNUM... | 20 | | | Character | | No |
| 3 | DE_MATTERNUM... | 20 | | | Character | | No |
| 4 | DE_DATETIME | 8 | | | DateTime | | No |
| 5 | DE_TRANSACTI... | 3 | | | Character | | No |
| 6 | DE_PAYEE | 50 | | | Character | | No |
| 7 | DE_PTOCODE | 75 | | | Character | | No |
| 8 | DE_AMOUNT | 10 | 2 | | Numeric | | No |
| 9 | DE_PLUSMINUS | 2 | | | Numeric | | No |
| 10 | DE_WHO | 25 | | | Character | | No |
| 11 | DE_LOCATION | 10 | | | Character | | No |
| 12 | DE_CHECKNUMB... | 10 | | | Numeric | | No |
| 13 | DE_NOTES | 4 | | | Memo | | No |
| 14 | DE_FEE1 | 8 | 2 | | Numeric | | No |
| 15 | DE_DATEDUE1 | 8 | | | Date | | No |
| 16 | DE_FEE2 | 8 | 2 | | Numeric | | No |
| 17 | DE_DATEDUE2 | 8 | | | Date | | No |
| 18 | DE_FEE3 | 8 | 2 | | Numeric | | No |
| 19 | DE_DATEDUE3 | 8 | | | Date | | No |
| 20 | DE_STATUS | 17 | | | Character | | No |
| 21 | DE_SELECTED | 1 | | | Logical | | No |
| 22 | DE_PRINTDATE... | 8 | | | DateTime | | No |
| 23 | DE_EXPORTDAT... | 8 | | | DateTime | | No |
| | ** Total ** | 328 | | | | | |
| | Structure for table: | | | C:\PMCSOURCE\PTOCODE.DBF | | | |
| | Number of data records: | 149 | | | | | |
| | Date of last update: | 05/16/1997 | | | | | |
| | Code Page: | 1252 | | | | | |

-continued

|   | Field | Width | Dec | Type | Index |
|---|---|---|---|---|---|
| 1 | PT_CODE | 75 | | Character | No |
| 2 | PT_USPTOCODE | 1 | | Logical | No |
| | ** Total ** | 77 | | | |

Structure for table: C:\PMCSOURCE\RATE.DBF
Number of data records: 48
Date of last update: 06/27/1997
Code Page: 1252

|   | Field | Width | Dec | Type | Index |
|---|---|---|---|---|---|
| 1 | RA_PLAN | 20 | | Character | No |
| 2 | RA_LOWERLIMI . . . | 8 | 2 | Numeric | No |
| 3 | RA_UPPERLIMI . . . | 8 | 2 | Numeric | No |
| 4 | RA_DAYSDUE1 | 3 | | Numeric | No |
| 5 | RA_AMOUNT1 | 8 | 2 | Numeric | No |
| 6 | RA_DAYSDUE2 | 3 | | Numeric | No |
| 7 | RA_AMOUNT2 | 8 | 2 | Numeric | No |
| 8 | RA_DAYSDUE3 | 3 | | Numeric | No |
| 9 | RA_AMOUNT3 | 8 | 2 | Numeric | No |
| 10 | RA_NOTALLOWE . . . | 1 | | Logical | No |
| | ** Total ** | 71 | | | |

Structure for table: C:\PMCSOURCE\SETUP.DBF
Number of data records: 10
Date of last update: 07/22/1997
Memo file block size: 64
Code Page: 1252

|   | Field | Width | Dec | Type | Index |
|---|---|---|---|---|---|
| 1 | SU_ITEM | 20 | | Character | No |
| 2 | SU_NUMBER | 10 | 2 | Numeric | No |
| 3 | SU_DATA | 4 | | Memo | No |
| | ** Total ** | 35 | | | |

Structure for table: C:\PMCSOURCE\TRANTYPE.DBF
Number of data records: 6
Date of last update: 06/10/1997
Code Page: 1252

|   | Field | Width | Dec | Type | Index |
|---|---|---|---|---|---|
| 1 | TR_TRANSACTI . . . | 3 | | Character | No |
| 2 | TR_DESCRIPTI . . . | 20 | | Character | No |
| 3 | TR_PLUSMINUS | 2 | | Numeric | No |
| 4 | TR_CHKACCTVA . . . | 1 | | Logical | No |
| 5 | TR_AUTACCTVA . . . | 1 | | Logical | No |
| 6 | TR_CHKLIMITE . . . | 1 | | Logical | No |
| 7 | TR_AUTLIMITE . . . | 1 | | Logical | No |
| 8 | TR_CHARGEFEE | 1 | | Logical | No |
| | ** Total ** | 31 | | | |

Structure for table: C:\PMCSOURCE\USER.DBF
Number of data records: 1
Date of last update: 05/02/1997
Code Page: 1252

|   | Field | Width | Dec | Type | Index |
|---|---|---|---|---|---|
| 1 | US_ID | 20 | | Character | No |
| 2 | US_LAST | 15 | | Character | No |
| 3 | US_FIRST | 15 | | Character | No |
| 4 | US_PASSWORD | 15 | | Character | No |
| 5 | US_CHECKBALA . . . | 1 | | Logical | No |
| 6 | US_VIEWREQUE . . . | 1 | | Logical | No |
| 7 | US_CREATEREQ . . . | 1 | | Logical | No |
| 8 | US_CANCELREQ . . . | 1 | | Logical | No |
| 9 | US_MODIFYACC . . . | 1 | | Logical | No |
| 10 | US_PRINTREPO . . . | 1 | | Logical | No |
| 11 | US_EXTRACTDA . . . | 1 | | Logical | No |
| | ** Total ** | 73 | | | |

```
Program File: MAIN.PRG
_SCREEN.Width = 633
_SCREEN.Height = 418
_SCREEN.Icon = "opening.ico"
SET CENTURY ON
SET BELL OFF
SET CONFIRM ON
SET DELETED ON
SET MULTILOCKS ON
SET PROCEDURE TO MAIN.PRG
OPEN DATABASE PTFM
PUBLIC frmMenu, gcLoginID, gcFullName, gcLocation, gcProgName
USE Setup
SET ORDER TO Item
IF SEEK ("PROGNAME")
    gcProgName = TRIM(Setup.SU_Data)
    _SCREEN.Caption = gcProgName
```

-continued

```
ELSE
    gcProgName = "Patent & Trademark Fee Management"
ENDIF
IF SEEK("LOGINID")
    gcLoginID = TRIM(Setup.SU_Data)
ELSE
    gcLoginID = "Unknown"
ENDIF
IF SEEK("FULLNAME")
    gcFullName = TRIM(Setup.SU_Data)
ELSE
    gcFullName = "Unknown"
ENDIF
IF SEEK("LOCATION")
    gcLocation = TRIM(Setup.SU_Data)
ELSE
    gcLocation = "Unknown"
ENDIF
CLOSE TABLES ALL
DO FORM Menu NAME frmMenu
READ EVENTS
**************************************
FUNCTION GetDueDate
* Finds the Monday which is the specified number of weeks after
* the date the request was made. If the request was made on a
* Monday, do not count that Monday.
LPARAMETERS ldDate, lnNumMondays
Local lnMondayCnt
lnMondayCnt = 0
DO WHILE lnMondayCnt < lnNumMondays
    ldDate = ldDate + 1
    IF DOW(ldDate,2) = 1
        lnMondayCnt = lnMondayCnt + 1
    ENDIF
ENDDO
RETURN ldDate
**************************************
FUNCTION TextDollar
PARAMETERS nNumber
LOCAL lnDollars, lnCents
lnDollars = INT(nNumber)
lnCents = (nNumber − lnDollars) * 100
RETURN TextNumeric(lnDollars)+"AND "+STR(lnCents,2)+"/100
DOLLARS"
**************************************
FUNCTION TextNumeric
PARAMETERS nNumber
LOCAL lcString, lnWorkNumber
lnWorkNumber  = nNumber
lcString         = " "
IF lnWorkNumber >= 1000000
    lcString = TextNumeric(lnWorkNumber/1000000) + "Million "
    lnWorkNumber = lnWorkNumber −
(INT (lnWorkNumber/1000000)*1000000)
ENDIF
IF lnWorkNumber >= 1000
    lcString = lcString + TextNumeric(lnWorkNumber/1000) +
"Thousand "
    lnWorkNumber = lnWorkNumber − (INT(lnWorkNumber/1000)*1000)
ENDIF
DO CASE
CASE lnWorkNumber >= 900
    lcString = lcString + "Nine Hundred "
    lnWorkNumber = lnWorkNumber − 900
CASE lnWorkNumber >= 800
    lcString = lcString + "Eight Hundred "
    lnWorkNumber = lnWorkNumber − 800
CASE lnWorkNumber >= 700
    lcString = lcString + "Seven Hundred "
    lnWorkNumber = lnWorkNumber − 700
CASE lnWorkNumber >= 600
    lcString = lcString + "Six Hundred "
    lnWorkNumber = lnWorkNumber − 600
CASE lnWorkNumber >= 500
    lcString = lcString + "Five Hundred "
    lnWorkNumber = lnWorkNumber − 500
CASE lnWorkNumber >= 400
    lcString = lcString + "Four Hundred "
    lnWorkNumber = lnWorkNumber − 400
```

-continued

```
CASE lnWorkNumber >= 300
    lcString = lcString + "Three Hundred "
    lnWorkNumber = lnWorkNumber − 300
CASE lnWorkNumber >= 200
    lcString = lcString + "Two Hundred "
    lnWorkNumber = lnWorkNumber − 200
CASE lnWorkNumber >= 100
    lcString = lcString + "One Hundred "
    lnWorkNumber = lnWorkNumber − 100
ENDCASE
DO CASE
CASE lnWorkNumber >= 90
    lcString = lcString + "Ninety "
    lnWorkNumber = lnWorkNumber − 90
CASE lnWorkNumber >= 80
    lcString = lcString + "Eighty "
    lnWorkNumber = lnWorkNumber − 80
CASE lnWorkNumber >= 70
    lcString = lcString + "Seventy "
    lnWorkNumber = lnWorkNumber − 70
CASE lnWorkNumber >= 60
    lcString = lcString + "Sixty "
    lnWorkNumber = lnWorkNumber − 60
CASE lnWorkNumber >= 50
    lcString = lcString + "Fifty "
    lnWorkNumber = lnWorkNumber − 50
CASE lnWorkNumber >= 40
    lcString = lcString + "Forty "
    lnWorkNumber = lnWorkNumber − 40
CASE lnWorkNumber >= 30
    lcString = lcString + "Thirty "
    lnWorkNumber = lnWorkNumber − 30
CASE lnWorkNumber >= 20
    lcString = lcString + "Twenty "
    lnWorkNumber = lnWorkNumber − 20
CASE lnWorkNumber >= 19
    lcString = lcString + "Nineteen "
    lnWorkNumber = lnWorkNumber − 19
CASE lnWorkNumber >= 18
    lcString = lcString + "Eighteen "
    lnWorkNumber = lnWorkNumber − 18
CASE lnWorkNumber >= 17
    lcString = lcString + "Seventeen "
    lnWorkNumber = lnWorkNumber − 17
CASE lnWorkNumber >= 16
    lcString = lcString + "Sixteen "
    lnWorkNumber = lnWorkNumber − 16
CASE lnWorkNumber >= 15
    lcString = lcString + "Fifteen "
    lnWorkNumber = lnWorkNumber − 15
CASE lnWorkNumber >= 14
    lcString = lcString + "Fourteen "
    lnWorkNumber = lnWorkNumber − 14
CASE lnWorkNumber >= 13
    lcString = lcString + "Thirteen "
    lnWorkNumber = lnWorkNumber − 13
CASE lnWorkNumber >= 12
    lcString = lcString + "Twelve "
    lnWorkNumber = lnWorkNumber − 12
CASE lnWorkNumber >= 11
    lcString = lcString + "Eleven "
    lnWorkNumber = lnWorkNumber − 11
CASE lnWorkNumber >= 10
    lcString = lcString + "Ten "
    lnWorkNumber = lnWorkNumber − 10
ENDCASE
DO CASE
CASE lnWorkNumber >= 9
    lcString = lcString + "Nine "
    lnWorkNumber = lnWorkNumber − 9
CASE lnWorkNumber >= 8
    lcString = lcString + "Eight "
    lnWorkNumber = lnWorkNumber − 8
CASE lnWorkNumber >= 7
    lcString = lcString + "Seven "
    lnWorkNumber = lnWorkNumber − 7
CASE lnWorkNumber >= 6
    lcString = lcString + "Six "
    lnWorkNumber = lnWorkNumber − 6
```

```
                            -continued

CASE lnWorkNumber >= 5
    lcString = lcString + "Five "
    lnWorkNumber = lnWorkNumber - 5
CASE lnWorkNumber >= 4
    lcString = lcString + "Four "
    lnWorkNumber = lnWorkNumber - 4
CASE lnWorkNumber >= 3
    lcString = lcString + "Three "
    lnWorkNumber = lnWorkNumber - 3
CASE lnWorkNumber >= 2
    lcString = lcString + "Two "
    lnWorkNumber = lnWorkNumber - 2
CASE lnWorkNumber >= 1
    lcString = lcString + "One "
    lnWorkNumber = lnWorkNumber - 1
ENDCASE
IF EMPTY(lcString)
    lcString = "No "
ENDIF
RETURN lcString
```

Conclusion

A computerized method and system in which a patent or trademark fee for a client of a firm is charged against an account maintained by a financing organization separate from the firm has been described. In particular, preferred methods, exemplary system architectures, and exemplary hardware implementations of the present invention have been described.

It is noted that as various computer systems have been described in relation to first information, second information, accounts, etc., it is assumed in such description that the computer systems do not directly manipulate the first information, second information, accounts, etc., but rather manipulate data representing the first information, second information, accounts, etc., as those of ordinary skill within the art will appreciate.

Furthermore, although specific embodiments have been illustrated and described, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computerized method for managing patent and trademark fees comprising:

inputting identification information for a matter of a client of a firm and a requested fee associated with the matter for payment to an agency as data representing the identification information into a computer system, wherein the agency comprises a patent or patent and trademark agency;

issuing a charge for the requested fee at the computer workstation for transferral to the agency, the charge payable against an account maintained at least in part by an organization separate from the firm;

transferring electronically data representing first information regarding the charge for the requested fee to a computer system accessible by the organization; and, reconciling electronically the data representing the first information regarding the charge with data representing second information from an external source regarding the charge;

generating data representing a fee invoice including the charge and electronically transmitting the data representing the fee invoice to an accounting computer system maintained by the firm;

generating a client invoice including the fee invoice at the accounting computer system for delivery to the client; and, generating a firm invoice including the charge for delivery to the firm, wherein the client invoice corresponds to the firm invoice such that payment by the client to the firm for the client invoice provides funds for payment by the firm to the organization for the firm invoice.

2. The computerized method of claim 1, wherein generating data representing a fee invoice including the charge also comprises printing a paper copy of the data representing the fee invoice on a printer.

3. The computerized method of claim 1, wherein the first information and the second information each include the amount of the requested fee.

4. The computerized method of claim 1, wherein the agency is selected from the group of patent agencies consisting of the United States Patent and Trademark Office, and the European Patent Office.

5. The computerized method of claim 1, wherein the charge is issued at a computer workstation comprising a computer of a network of a plurality of computers.

6. The computerized method of claim 1, wherein the accounting computer system comprises a computer of a network of a plurality of computers.

7. The computerized method of claim 1, wherein the data representing first information regarding the charge for the requested fee is transferred electronically to the organization daily.

8. The computerized method of claim 1, wherein the data representing the fee invoice including the charge is transferred to the accounting computer system monthly.

9. The computerized method of claim 1, wherein the agency comprises a foreign associate firm.

10. The computerized method of claim 1, wherein the account maintained at least in part by the organization is an account with a financial institution, and issuing a charge for the requested fee comprises printing a check for the requested fee payable against the account maintained at least in part by the organization on a printer operatively coupled to the computer workstation for delivery to the agency.

11. The computerized method of claim 10, wherein the external source comprises a statement received from the financial institution regarding transactions regarding the account, the transactions including checks drawn against the account.

12. The computerized method of claim 1, wherein the account maintained at least in part by the organization is a deposit account with the agency, and issuing a charge for the request fee comprises generating an authorization for debit of the requested fee from the account.

13. The computerized method of claim 12, wherein the external source comprises a statement received from the agency regarding transactions regarding the account, the transactions including debits made from the account.

14. A computerized method for managing patent and trademark fees comprising:
inputting identification information for a matter of a client of a firm and a requested fee associated with the matter for payment to an agency as data representing the identification information into a computer system;
transferring electronically data representing first information regarding a charge for the requested fee from the computer system to a fee computer system maintained by an organization separate from the firm, to request permission to issue the charge for the requested fee at the computer system;
issuing the charge for the requested fee for transferring to the agency at the computer system upon receiving approval from the fee computer system, the charge payable against an account maintained at least in part by the organization;
inputting second information regarding the charge received from an external source as data representing the second information into the fee computer system; and,
reconciling electronically the data representing the first information regarding the charge with the data representing the second information regarding the charge at the fee computer system;
generating data representing a fee invoice including the charge at the computer system and electronically transferring the data representing the fee invoice to an accounting computer system maintained by the firm;
generating a client invoice including the fee invoice at the accounting computer system for delivery to the client; and,
generating a firm invoice including the charge at the fee computer system for delivery to the firm,
wherein the client invoice corresponds to the firm invoice such that payment by the client to the firm for the client invoice is used at least in part as payment by the firm to the organization for the firm invoice.

15. The computerized method of claim 14, wherein the account maintained at least in part by the organization is an account with a financial institution, and issuing a charge for the requested fee at the computer system comprises printing a check for the requested fee payable against the account maintained at least in part by the organization on a printer operatively coupled to the computer system for delivery to the agency.

16. The computerized method of claim 14, wherein the account maintained at least in part by the organization is a deposit account with the agency, and issuing a charge for the requested fee at the computer system comprises generating an authorization for debit of the requested fee from the account.

17. The computerized method of claim 14, wherein the first information and the second information each include the amount of the requested fee.

18. A computerized system for payment of patent and trademark fees comprising:
a firm computer system maintained by a firm, the firm computer system storing data representing a charge for a requested fee for transmittal to an agency;
a fee computer system maintained by a first organization separate from the firm, the fee computer system receptive to data electronically transmitted by the firm computer system and representing first information regarding the charge; and,
an account computer system maintained by a second organization separate from the first organization and the firm, the account computer system storing data representing an account maintained at least in part by the first organization and against which the charge is payable,
wherein the account computer system generates a statement including data representing second information regarding the charge, which is input into the fee computer system and reconciled by the fee computer system with the data representing the first information;
a first computer subsystem to issue the charge for the requested fee and to generate data representing a fee invoice including the charge; and,
a second computer subsystem to receive electronically the data representing the fee invoice and to generate a client invoice including the fee invoice for delivery to the client;
wherein the fee computer system also generates a firm invoice including the charge for delivery to the firm, wherein the client invoice corresponds to the firm invoice such that payment by the client to the firm for the client invoice is used at least in part as payment by the firm to the first organization for the firm invoice.

19. The computerized system of claim 18, wherein the statement is in an electronic format readable by the fee computer system, and is input into the fee computer system via electronic transmission from the account computer system.

20. The computerized system of claim 18, wherein the first computer subsystem of the firm computer system electronically transfers the data representing the first information regarding the charge for the requested fee prior to issuing the charge to request permission to issue the charge for the requested fee.

21. The computerized system of claim 18, herein the second organization comprises a financial institution, and the charge comprises a check for the requested fee payable against the account maintained by the first organization, the check printed on a printer of the firm computer system.

22. The computerized system of claim 18, wherein the second organization is the agency, and the charge comprises an authorization for debit of the requested fee from the account.

23. The computerized system of claim 18, wherein the first information and the second information each include the amount of the requested fee.

24. A computerized method comprising:
inputting identification data for a matter of a client of a firm and a requested fee associated with the matter for payment to a third party into a computer system;
issuing a charge for the requested fee for transmittal to the third party, the charge payable against an account maintained at least in part by an organization separate from the firm;

recording data representing the charge for the requested fee in a fee computer system maintained by the organization;

generating a fee invoice wherein the fee invoice is issued by the organization, wherein the fee invoice represents an amount billed by the separate organization to the firm, and recording the data representing the fee invoice in an accounting computer system maintained by the firm;

the law firm generating a client invoice from the accounting computer system for at least one of the matters wherein the invoice includes at least in part a billing for reimbursement by the client of amounts billed by the separate organization to the firm for the at least one respective matter, the client invoice for delivery to the client; and, wherein the client invoice corresponds at least in part to the firm invoice such that payment by the client to the firm for the client invoice is used at least in part as payment by the firm to the organization for the firm invoice.

25. The computerized method of claim 24, wherein the account maintained in part by the organization is an account with a financial institution, and issuing a charge for the requested fee at the computer system comprises printing a check for the requested fee payable against the account on a printer operatively coupled to the computer system for delivery to the third party.

26. The computerized method of claim 24, wherein the account maintained in part by organization is a deposit account with the third party, and issuing a charge for the requested fee at the computer system comprises generating an authorization for debit of the requested fee from the account.

27. The computerized method of claim 24, wherein generating a fee invoice comprises printing a paper copy of the data representing the fee invoice on a printer operatively coupled to the computer system.

28. The computerized method of claim 24, wherein the third party is selected from the group of patent agencies consisting of the United States Patent and Trademark Office, and the European Patent Office.

29. The computerized method of claim 24, wherein the computer system comprises a network of a plurality of computers.

30. The computerized method of claim 24, wherein the accounting computer system comprises a network of a plurality of computers.

31. The computerized method of claim 24, wherein data representing the requested fees is transmitted electronically from the computer system to the fee computer system daily.

32. The computerized method of claim 24, wherein data representing the fee invoice is transmitted to the accounting computer system periodically.

33. The computerized method of claim 24, wherein the third party comprises a patent or patent and trademark agency.

34. (New) The computerized method of claim 24, wherein the third party comprises a foreign associate firm.

* * * * *

UNITED STATES PATENT AND TRADEMARK OFFICE
CERTIFICATE OF CORRECTION

PATENT NO.   : 6,363,361 B1
DATED        : March 26, 2002
INVENTOR(S)  : Steven W. Lundberg It is certified that error appears in the above-identified patent and that said Letters Patent is hereby corrected as shown below:

Column 36,
Line 2, insert -- data representing -- after "and the", therefor.
Line 50, delete "herein" and insert -- wherein --, therefor.
Line 53, insert -- at least in part -- after "maintained", therefor.

Column 38,
Line 24, delete "transmitted" and insert -- transferred --, therefor.
Line 30, delete "(New)", therefor.

Signed and Sealed this

Seventh Day of January, 2003

JAMES E. ROGAN
*Director of the United States Patent and Trademark Office*